United States Patent [19]

Tanaami et al.

[11] Patent Number: 5,633,751

[45] Date of Patent: May 27, 1997

[54] CONFOCAL OPTICAL SCANNER

[75] Inventors: Takeo Tanaami; Kenta Mikuriya, both of Tokyo, Japan

[73] Assignee: Yokogawa Electric Corporation, Tokyo, Japan

[21] Appl. No.: 626,014

[22] Filed: Mar. 22, 1996

Related U.S. Application Data

[60] Continuation of Ser. No. 344,143, Nov. 23, 1994, abandoned, which is a division of Ser. No. 942,156, Sep. 8, 1992, Pat. No. 5,428,475.

[30] Foreign Application Priority Data

| Oct. 31, 1991 | [JP] | Japan | 3-286112 |
| Jan. 30, 1992 | [JP] | Japan | 4-15411 |
| Jun. 9, 1992 | [JP] | Japan | 4-149320 |

[51] Int. Cl.[6] ................................ G02B 21/06
[52] U.S. Cl. ............... 359/368; 359/234; 359/235; 359/389; 359/370
[58] Field of Search ............... 359/368, 370, 359/372, 385, 386, 389, 565, 741–743, 652–654, 727, 851–853, 209–212, 234–235

[56] References Cited

U.S. PATENT DOCUMENTS 5,162,941 11/1992 Favro et al. .................. 359/368

Primary Examiner—James Phan
Attorney, Agent, or Firm—Moonray Kojima

[57] ABSTRACT

A confocal optical scanner which realizes optical scanning without nonuniformity of brightness at the inside and outside periperies of the pinhole disk by arraying the pinholes along spiral tracks at the same pitch; which allows adjustment of decentering to be readily performed by disposing pinholes so that stripes do not occur even when decentering is large; which allows more incident light to be collected at the pinholes through a plurality of collector means by disposing the pinholes at focal points of the collector means; which improves luminous utilization efficacy by reducing the illumination area of light by adopting the collector means to focus outside of the aperture pupil; which prevents decrease of confocal resolution due to pinhole diameter by causing the light reflected from the sample to not enter a collector disk; and which reduces stray light from the pinhole disk by covering non-collector portions of the collector disk with a shading film.

7 Claims, 22 Drawing Sheets

Pinhole Pattern
(Both Radial Pitch and Peripheral Pitch are The Same.)

Number of Spirals m=12

Pinhole Pitch a : Most Inner Radius r0 ≒ 1:60

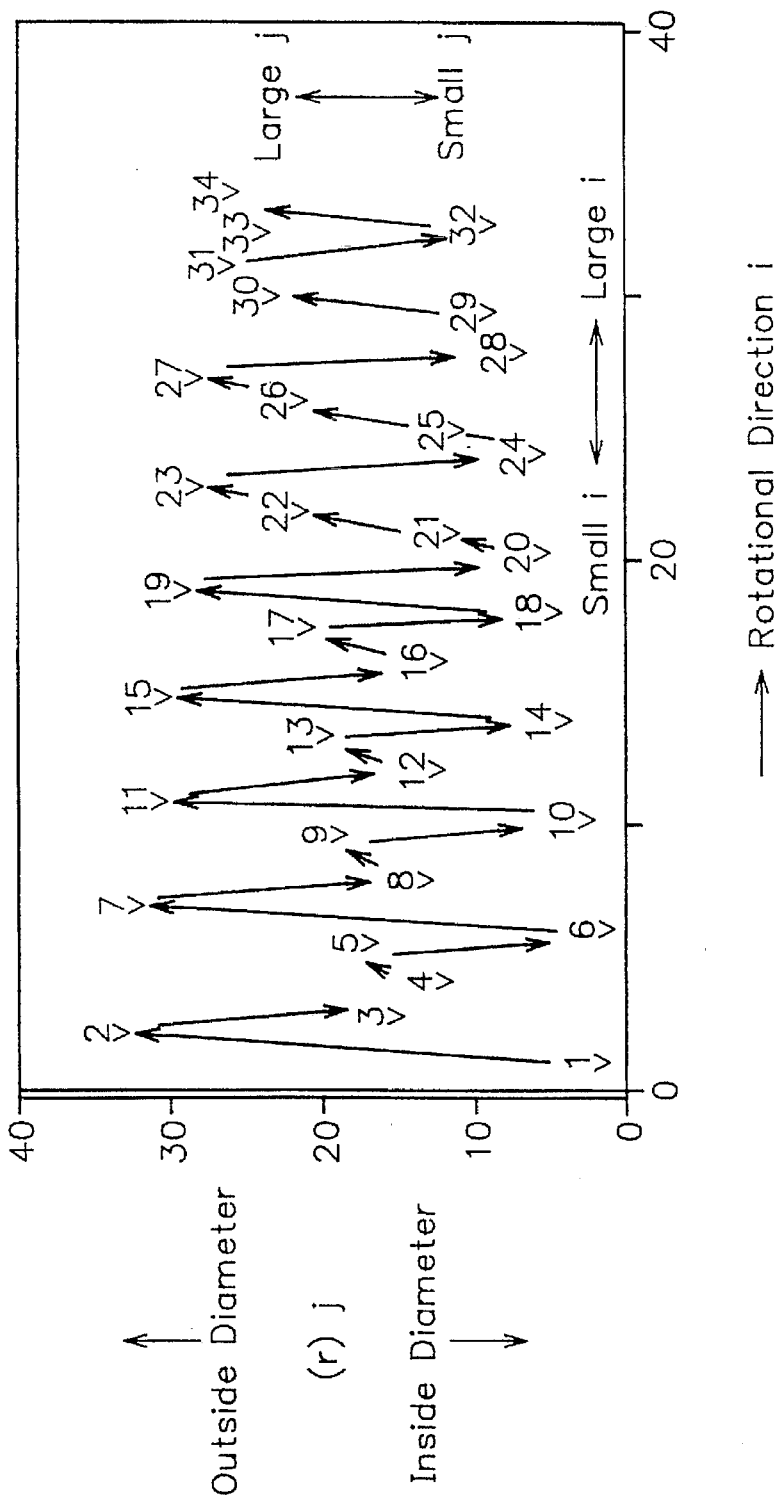

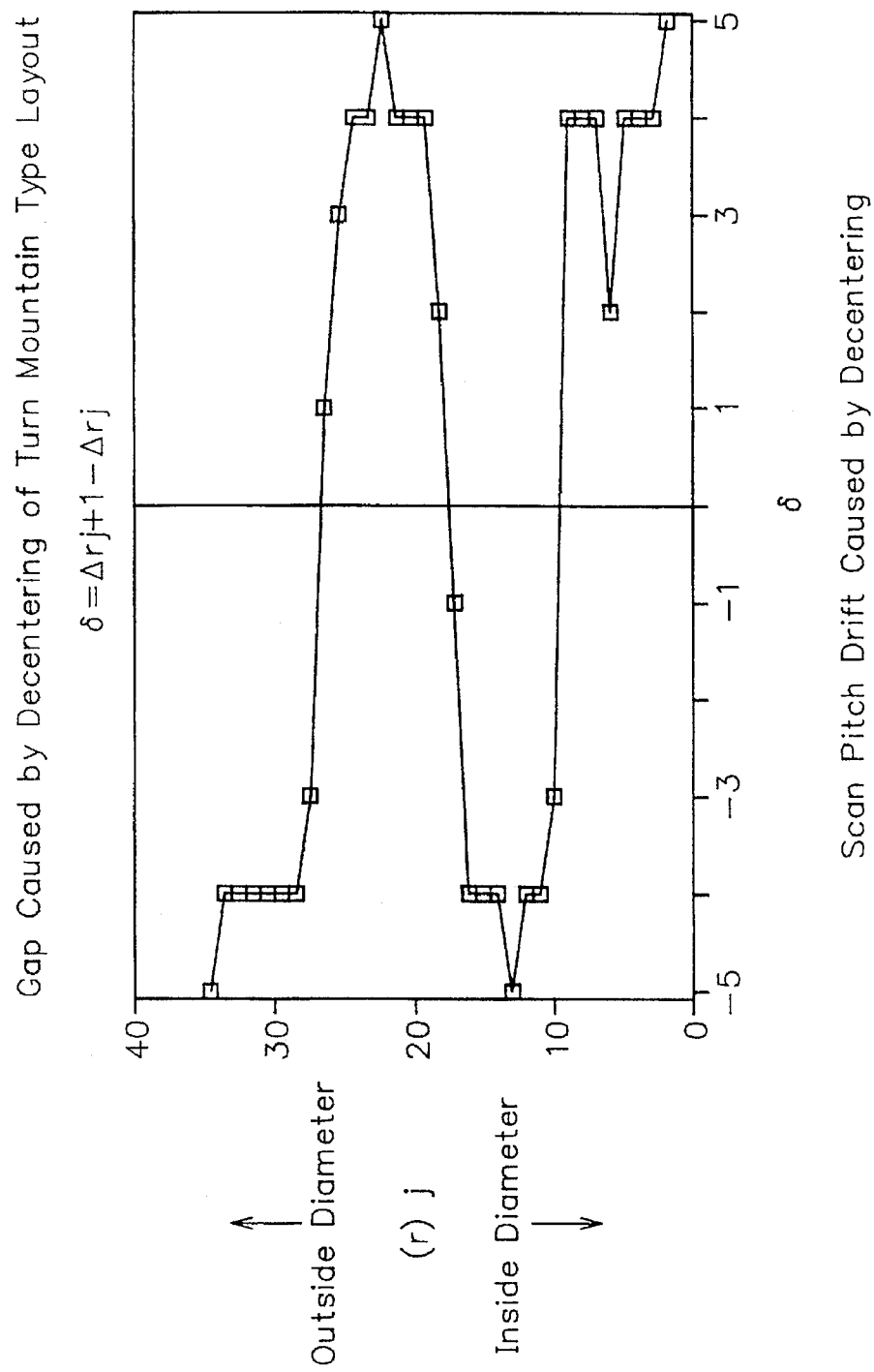

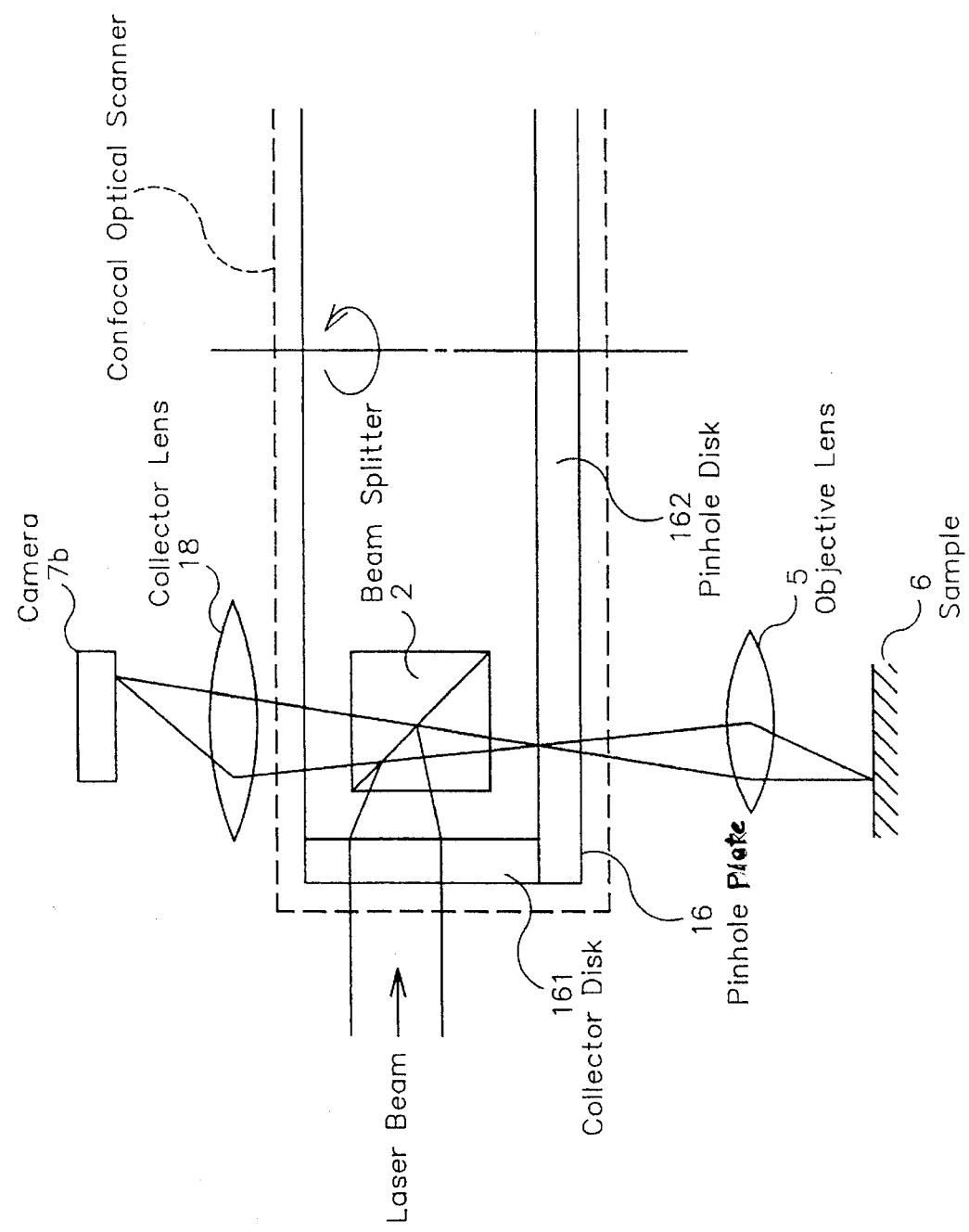

CONFOCAL OPTICAL SCANNER

This is a continuation of application Ser. No. 08/344,143, filed Nov. 23, 1994, now abandoned, which is a Division of Ser. No. 07/942,156 filed Sep. 8, 1992, now U.S. Pat. No. 5,428,475 issued Jun. 27, 1995.

BACKGROUND OF THE INVENTION

1. Field of Invention

This invention relates to a confocal optical scanner such as used, for example, in a confocal microscope; and more particularly, to an improved pinhole device used in such confocal optical scanner.

2. Description of the Prior Art

FIG. 1 depicts an exemplary confocal microscope using a confocal optical scanner; and FIG. 2 depicts an exemplary conventional pinhole disck used in a confocal optical scanner. In FIGS. 1 and 2, output light from a light source, not shown, is irradiated onto a pinhole disk 3, in which a plurality of pinholes 32 are defined in a spiral shape in plate 31, passing through a polarizer 1a and a beam splitter 2. Light passes through one or more of the pinholes 32, and then imping on sample 6, after passing through ¼ wave plate 4 and objective lens 5. Light reflected from sample 6 returns through pinholes 32, in the same optical path, and an image of sample 6 can then be seen by the human eye via beam splitter 2, polarizer 1b and eyepiece 7. Pinhole disk 3 is rotated at a constant speed by motor 8. The focusing light directed at sample 6 is scanned by movement of pinholes 32 due to rotation of disk 3.

In the conventional confocal optical scanner, the plurality of pinholes 32 are formed in a spiral shape on disk 3 as seen in FIG. 2, and are disposed isometrically when seen in a radial row. This particular placement of holes is used because in fabricating a mask for the pattern of the entire pinhole disk, it is necessary to copy the pattern of a radial row one by one at equal angles. Accordingly, the pitch between the pinholes increases with increase in radius, that is, as the pinholes get further from the center of the disk. Thus, one disadvantage of the conventional pinhole arrangement is that it is darker at the outer periphery and lighter at the inner periphery in terms of the amount of transmitted light. Thus, non-uniformity in brightness occurs when optical scanning is at the inside and outside peripheries of the disk.

The conventional optical scanner has another disadvantage, namely, when the center of the spiral shaped pattern of pinholes 32 and the center of rotation of the disk 3 drift apart from each other, stripes are caused on an image plane when one image plane is constructed by one scan. As shown in FIG. 3(A), the stripes occur when a track, which is assumed to be a circle, rotates with a decentering value e and is observed through a window, an x coordinate of an observation point A traces a cycloid, which is approximately a sine wave, whose amplitude changes by a dimension 2e in 180°. Consider the case when scanning of one image plane is measured by 90°. When scanning is started at point B in FIGS. 3(A) and 3(B), the radius increases by e until scanning arrives at point A. Thus, whereas point B' of the pinhole pitch should be scanned in one image plane in 90°, in fact it passes through point A whose radius is greater by a decentering value e than point B'. Accordingly, the interval between points B' and A is scanned excessively, and the image plane is whitened. In contrast, when the interval between points B' and C is scanned, scanning is not enough, so that the image plane is blackened. In practice, the scanning is carried out in an arc and the stripe caused by decentering takes the shape shown in FIG. 3(C). To eliminate such stripes, the decentering value e must be reduced to nil. However, that is difficult to achieve. Another way to reduce the stripes is to construct the image plane by doubling the scanning. But in that case, even if the decentering can be kept large, the signal to noise ratio (S/N) increases. Thus, in conventional devices, it has been difficult to eliminate the stripes.

Another disadvantage to conventional devices is that the pinhole disk and motor cannot be separated or either one or the other exchanged with others.

A futher disadvantage of the conventional device is that the luminous utilization efficacy is limited. For example, using the pinhole disk of FIG. 2, if the total aperture of the pinholes 32 is 1% of the total disk area, then light irradiated on the disk will pass through the pinholes in proportion to the opening area, that is in this case 1%.

Moreover, along the same line, another disadvantage is that large amount of light is reflected from the disk surface not defining the pinholes. This becomes stray light, which is not desired. One way of stopping or reducing stray light is to use a beam stop 7a on eyepiece 7, a polarizer 1a, and a ¼ wave plate 4. However, such means is not entirely successful in eliminating stray light, and is expensive.

SUMMARY OF THE INVENTION

According an object of the invention is to overcome the aforementioned and other problems and deficiencies of the prior art, by providing an arrangement of pinholes which enables optical scanning without having nonuniformity of brightness at the inside and outside peripheries of the pinhole disk.

A second object is to provide an arrangement of pinholes wherein stripes are prevented from occuring even though a large amount of decentering is present.

A third object is to provide a confocal optical scanner whose luminous utilization efficacy is improved by providing collector means at the light source side of the pinhole disk.

A fourth object is to provide a confocal optical scanner in which reflected stray light from the surface of the pinhole disk is reduced.

A fifth object is to provide a branch optical system between a collector disk and a pinhole disk so that no light reflected from a sample is inputted to the collector disk and so that luminous utilization efficacy is improved by the collector disk and so that the resolution of the pinhole diameter during imaging is maintained and so that the imaging characteristics are assured.

A sixth object is to reduce stray light from a pinhole disk by shading the part of the collector disk where no collector means exists.

BRIEF DESCRIPTION OF THE DRAWINGS

FIGS. 10(A) and 10(B) are diagrams depicting the scanning order and drift caused by decentering of a modified version of the pinhole arrangement of FIG. 6.

FIG. 21 is a diagram depicting a modified illustrative of the confocal optical scanner of FIG. 18.

DETAILED DESCRIPTION OF THE PREFERRED EMBODIMENTS

Figure 4:
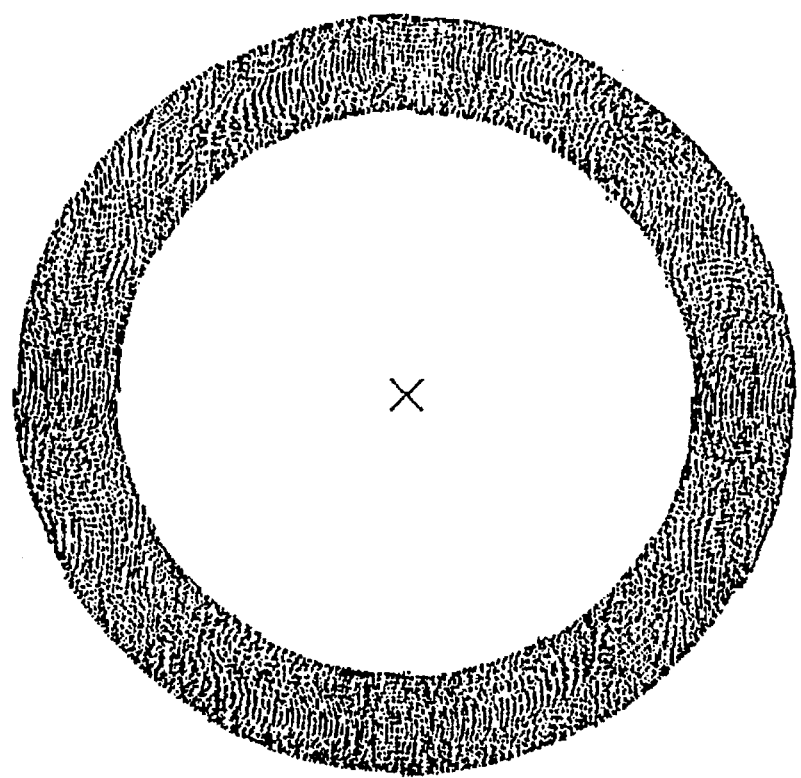
FIG. 4 is a diagram depicting a pinhole pattern of a first illustrative embodiment of the invention.

FIG. 4 shows an illustrative pinhole pattern wherein more than one thread of pinhole roles are disposed in a spiral shape and wherein the radial pitch of a track of an imaginary center line connecting the centers of a plurality of pinholes forming the pinhole rows, and the peripheral pitch along the spiral, are equal. This pattern is traced according to the following expressions (1) and (2).

$$r_i = r_o + \theta_i \cdot m \cdot a/2\pi \tag{1}$$

$$\theta_i = [2\pi/(m \cdot a)][-r_o + \sqrt{(r_o^2 + i \cdot m \cdot a^2/\pi)}\ ] \tag{2}$$

wherein i=0,1,2. . ..n (i.e order starting from inside of spiral)

$r_i$=radius of the ith pinhole.

$r_o$=inner most radius.

$\theta_i$=angle of ith pinhole.

m=number of spirals.

a=pinhole pitch.

wherein tracing conditions are a:$r_o$=1:60, and m=12.

Figure 5A:
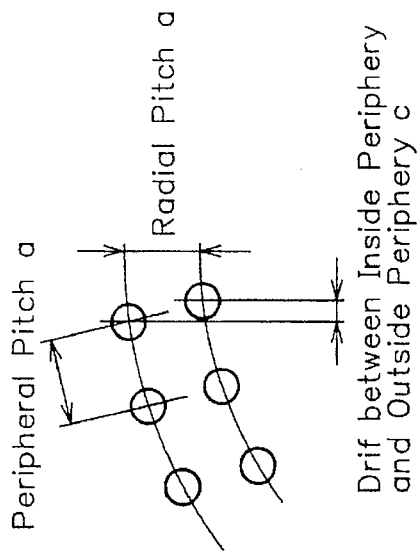
FIGS. 5(A)–5(E) are diagrams to explain the arrangement of pinholes in FIG. 4.
Figure 5B:
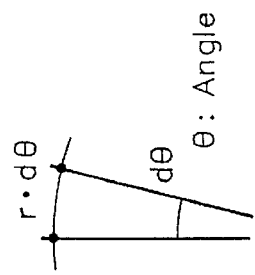

The significance of equations (1) and (2) is as follows. As shown in FIGS. 5(A) and 5(B), when the pinhole disk rotates one full circle, the radius becomes larger by m·a between the starting point and the ending point of the track of the spiral. Thus, the radius r is as follows.

$$r = r_o + \theta \cdot m \cdot a/2\pi \tag{3}$$

The length of arc l is as follows.

$$l = \int_0^\theta r \cdot d\theta = r_o\theta + (m \cdot a \cdot \theta^2)/(2 \cdot 2\pi) \tag{4}$$

When equation (4) is represented in terms of θ.

$$\theta = [2\pi/(m \cdot a)][-r_o + \sqrt{(r_o^2 + m \cdot a \cdot 1/\pi)}\ ] \tag{5}$$

From equation (5) and below equation (6), equation (7) is obtained.

$$l = i \cdot a \tag{6}$$

$$\theta = [2\pi/(m \cdot a)][-r_o + \sqrt{(r_o^2 + i \cdot m \cdot a^2/\pi)}\ ] \tag{7}$$

The pinhole pattern of FIG. 4 is traced using the equations (4) and (7) according to the stated tracing conditions.

Figure 5C:
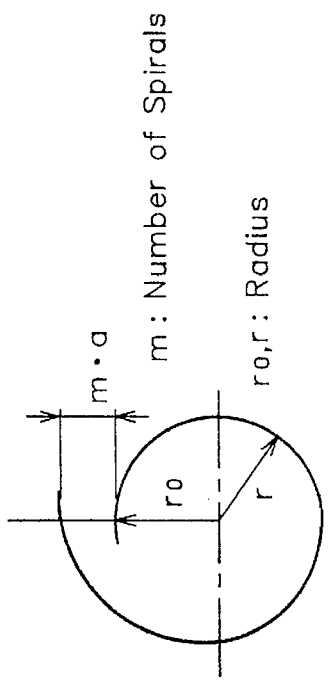

The pinhole arrangement shown in FIG. 4 is formed with a pinhole pitch a which is the same in the radial direction and in the peripheral direction, as shown in FIG. 5(C). That is to say, when the diameter changes by one pitch a, the number of pinholes per unit area is not changed, even though a drift c with the inside periphery ie caused. Accordingly, the density is equal to those pinholes arranged in a square and the density is constant regardless of the radius.

When the disk is rotated and the amount of light passed through each pinhole is assumed to be I (W=watt), the pinhole scans a range with a width a and length a to the neighboring pinhole and illuminance E is expressed as follows.

$$E = I/a^2 \text{ (i.e. units of W/m}^2\text{)} \tag{8}$$

Figure 1:
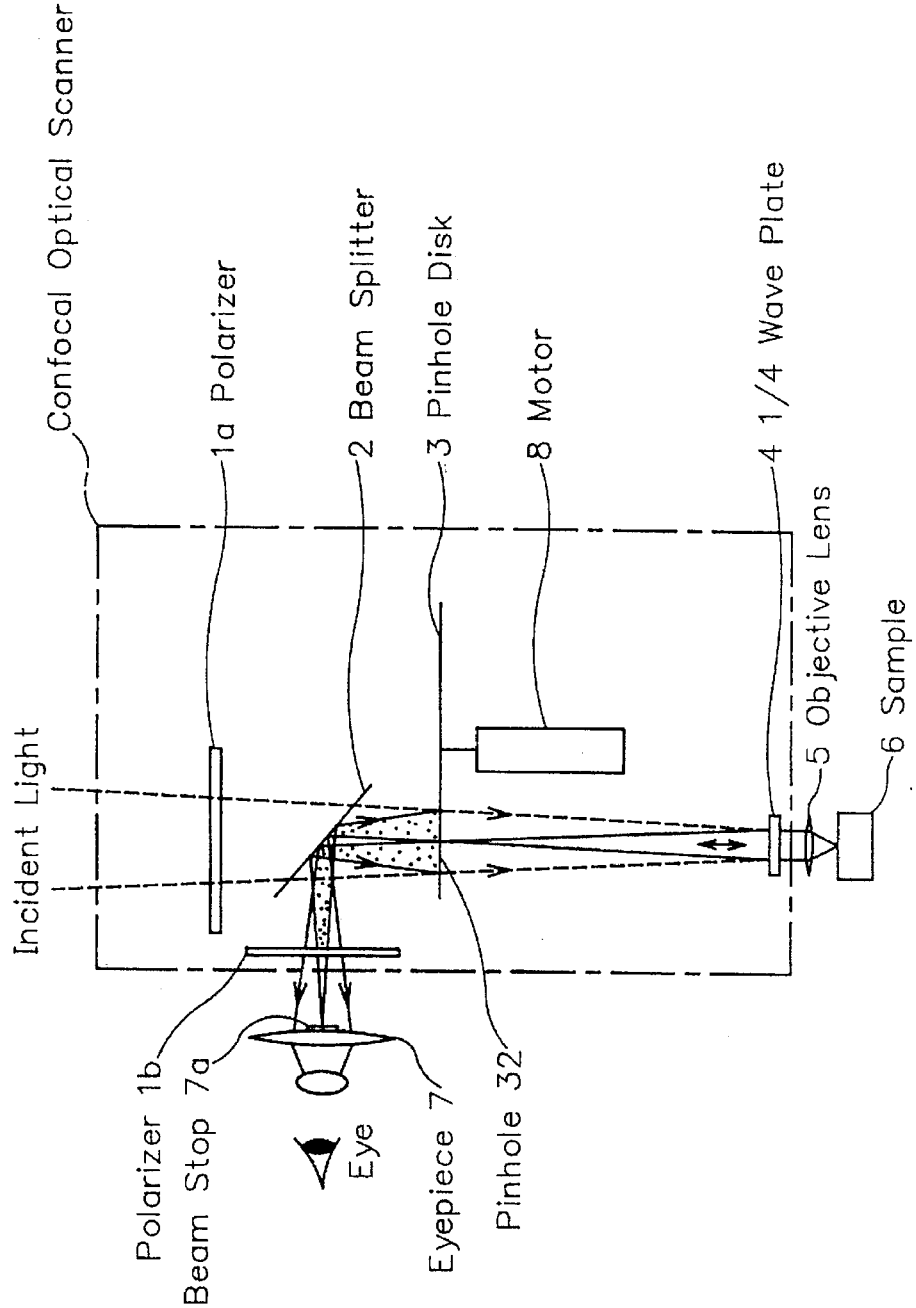
FIG. 1 is a drawing depicting an exemplary confocal microscope using a confocal optical scanner.
Figure 2:
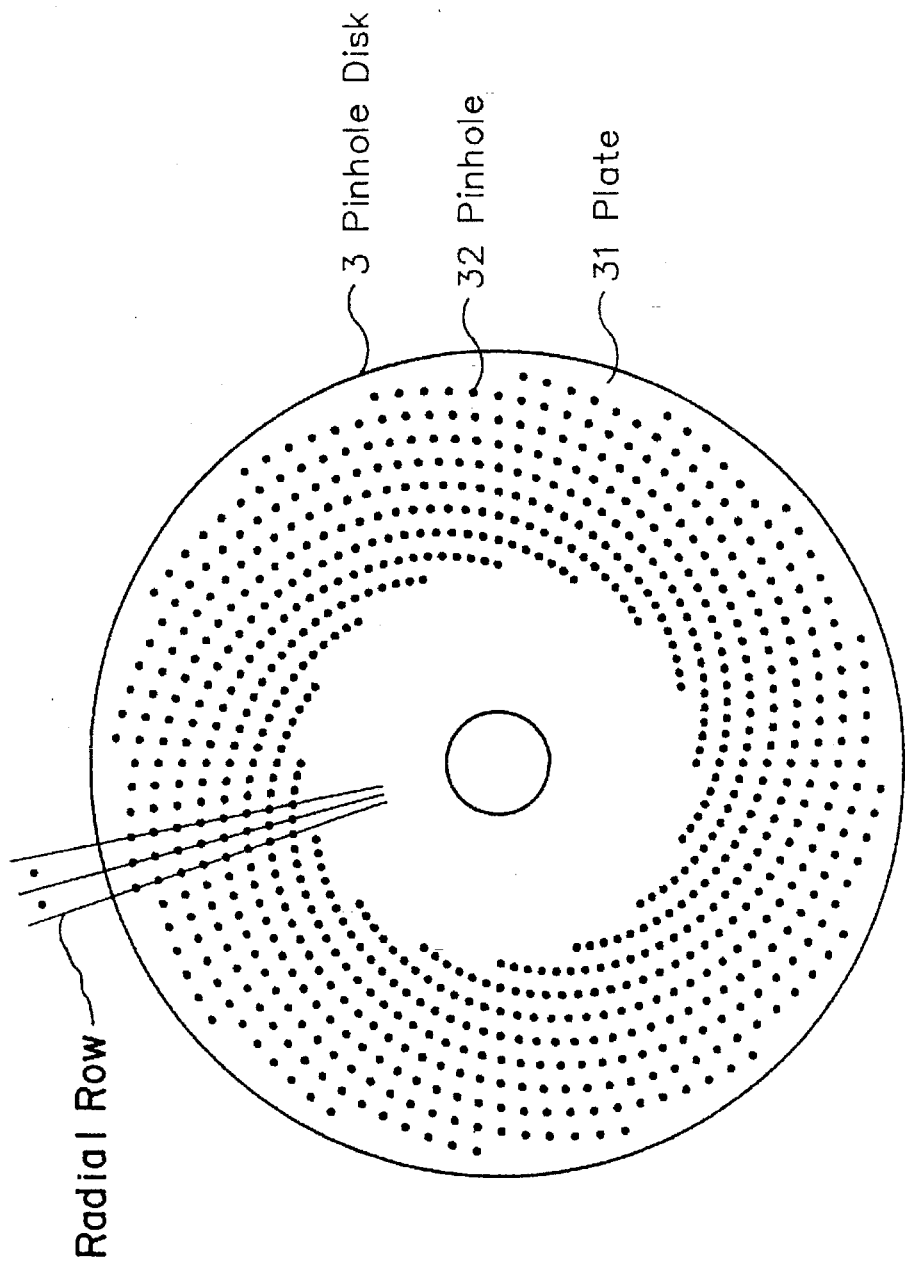
FIG. 2 is a top view depicting a conventional pinhole disk using in a confocal optical scanner.
Figure 3A:
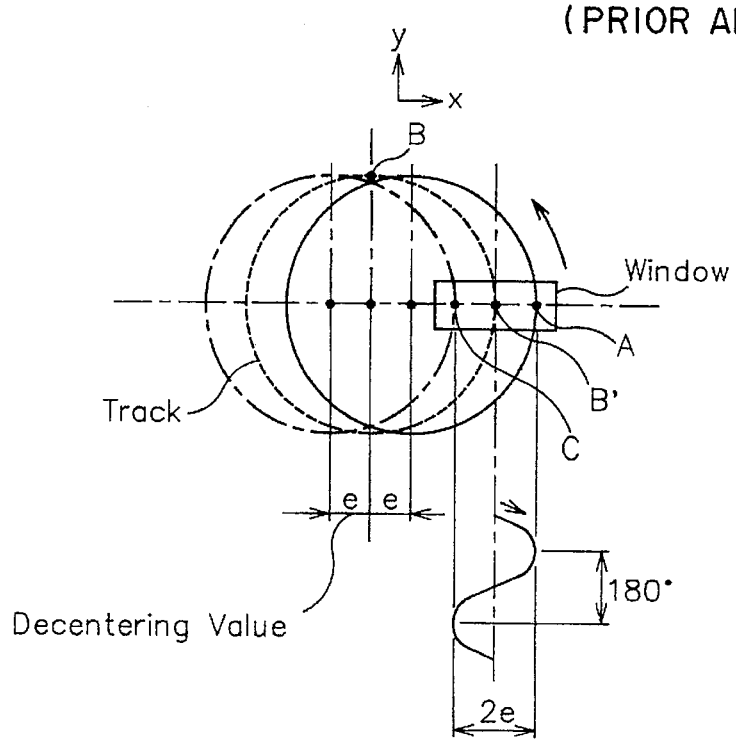
FIGS. 3(A),3(B) and 3(C) are diagrams to explain how stripes are caused by decentering.
Figure 3B:
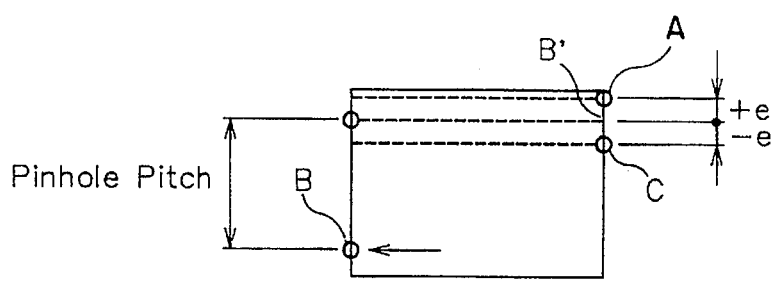
Figure 3C:
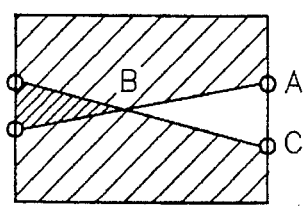
Figure 5D:
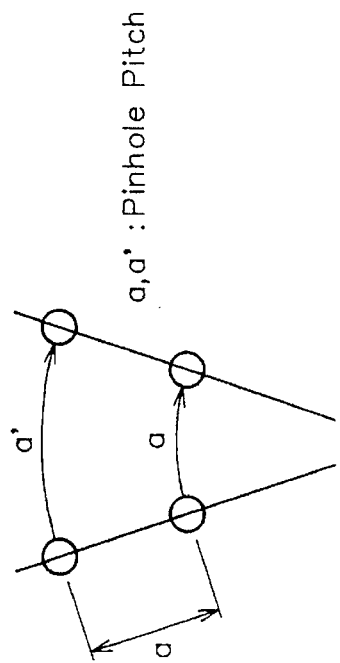
Figure 5E:
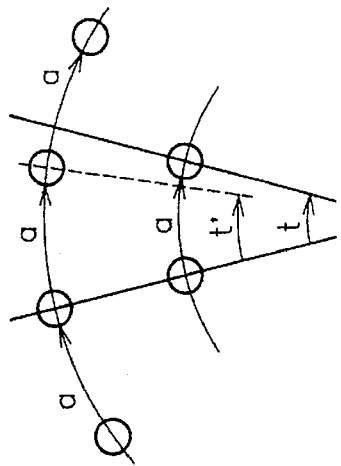

In the conventional pinhole disk having an isometric arrangement, such as shown in FIG. 2, the scanning distance per unit time (i.e the distance between neighboring pinholes) a' is greater than the length of the inner peripheral arc a as shown in FIG. 5(D). Thus, illuminance E' at the outside periphery is smaller than illuminance E at the inside periphery. On the other hand, with the invention pinhole disk having an equal pitch arrangement, the same length arc a is scanned both at the inside periphery and the outside periphery as shown in FIG. 5(E). Accordingly, the illuminance is constant regardless of the radius of the inside periphery or the outside periphery. That is, if it takes t seconds to scan one pitch at the inside periphery, and it takes t' seconds(with t'<t) to finish scanning the outside periphery, the neighboring pinhole illuminates the remaining t'–t seconds, thereby causing the amount of light at the inside periphery and the outside periphery to be constant.

The pinholes in the disk are arranged so that both the radial pitch and the peripheral pitch are the same along the track of the spiral. Thus, advantageously, in the invention, uniform brightness occurs regardless of the location along the radius at which scanning takes place.

Figure 6:
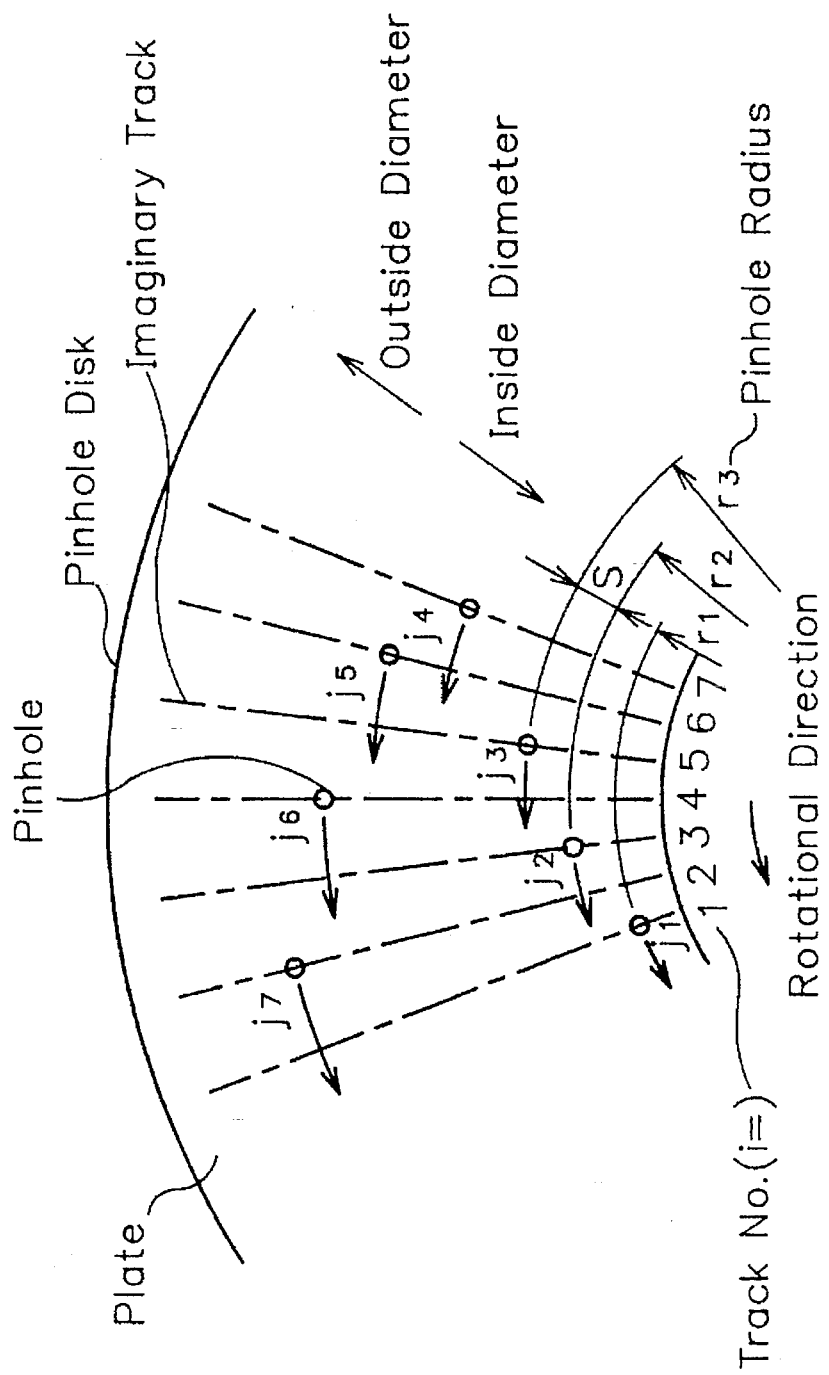
FIG. 6 is a diagram depicting a pinhole pattern of a second illustrative embodiment of the invention.

FIG. 6 shows a second illustrative embodiment of the invention wherein a plurality of rows of pinholes are arranged so that the radius of the center position of the pinholes differs from each other. In the arrangement, one image plane is scanned with a plurality of pinhole rows. Radial imaginary tracks are presumed to exist on a plate, as shown in FIG. 6, and the pinholes are disposed at different radii along the imaginary track. One image plane is constructed by scanning N pinholes. For this pinhole group, the numbers are indexed as follows, with N=7 in FIG. 6.

Rotational direction (imaginary track No) $i = 1, 2, \ldots, N$

Radial Direction from inside = $j_1, j_2, \ldots, j_N$

The radius of each pinhole is indexed in the radial (i.e. j) direction as $r_1, r_2, \ldots, r_N$. An increment of radius s is assumed to be constant between all the pinholes. That is the following applies.

$$r_{j+1} = r_j + s$$

wherein $r_1 = r_o + s$.

Figure 7C:
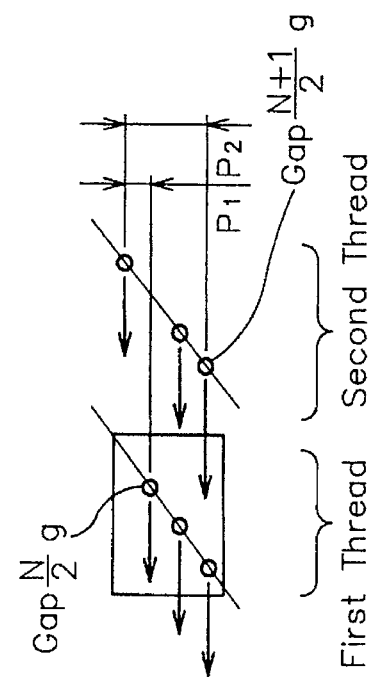
FIGS. 7(A)–7(C) are diagrams to explain the pinhole arrangement of FIG. 6.
Figure 7A:
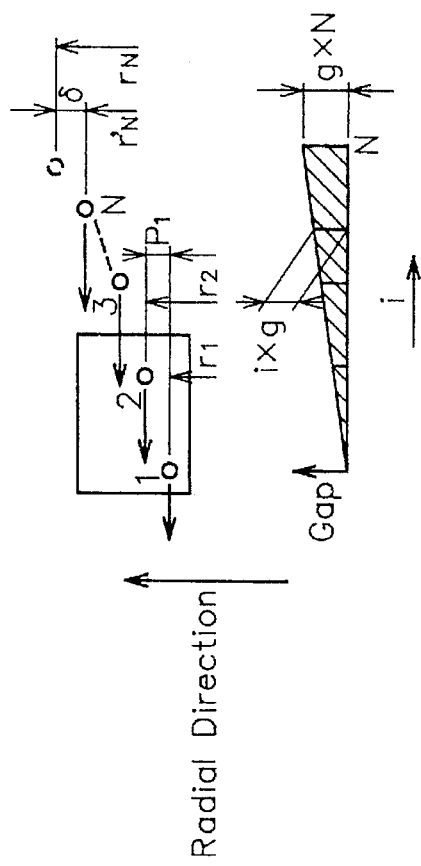
Figure 7B:
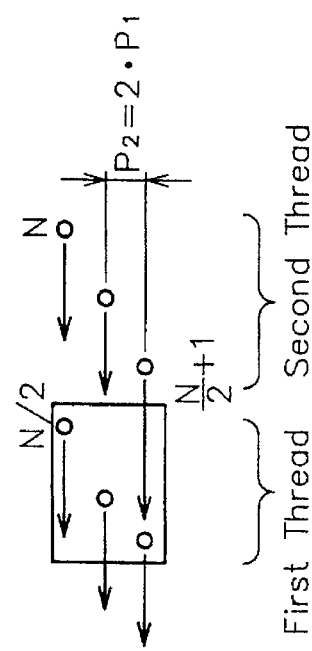

When scanning is carried out with a conventional pinhole arrangement wherein the rows are arranged in a spiral shape with a radius which regularly increases, drift $\delta(=g \cdot i)$ caused by decentering gradually increase as shown in FIG. 7(A) due to gap g between neighboring pinholes caused by the decentering in proportion to the rotation direction i (i.e. the track no.) At the last pinhole, i=N, the drift due to the decentering becomes $\delta = g \cdot N$. This results in scanning $r_N'$ being drawn back by the decentering although $r_N$ has to be originally scanned. If the scan pitch $P_1$ is increased by a factor of 2 to $p_2 = 2 \cdot p_1$ as shown in FIG. 7(B), one image plane is constructed by two threads. Then, the upper most thread is scanned at the N/2-th pinhole and the drift due to the decentering at this instant is $g \cdot N/2$. The drift is reduced by more than the one constructed by one thread. However, disadvantageously, with the conventional arrangement, this causes a problem in that the picture quality becomes course because the scanning must be doubled.

On the other hand, the center radius of the pinholes of the second thread is drifted as a whole by $p_1$ from the first thread as shown in FIG. 7(C), the gap between the first thread is scanned. Thus, the effect of decentering is reduced while keeping the same picture quality as that constructed by one thread. The thread is not limited to two, but, may be a plurality of threads. If the number of threads is regularly increased one by one to the ultimate number, it becomes N threads. That is, since the radius of the neighboring pinholes may be determined independently, a pattern that minimizes the effect of decentering may be selected. For a circular pattern, it becomes a radial isometric pitch. This results in the pinhole arrangement of FIG. 6.

In the pinhole arrangement of FIG. 6, the pinholes are disposed in such a manner that the pinholes at the inside diameter are odd numbered, and the pinholes at the outside diameter are even numbered, in the order of scanning of the pinholes, which are indexed with numbers in the rotation angle direction; and in such a manner that the radius regularly increases at the inside diameter and decreases at the outside diameter, under the following conditions.

1. N is assumed to be an odd number and N/2 is a rounded next higher number.
2. Where $1 \leq j \leq N/2$ (half of inside diameter).

Radius where pinhole is disposed ($r_j = r_o + s \cdot j$)  (9)

Track No. where pinhole is disposed ($i = 2j - 1$)  (10)

3. Where $N/2 < j \leq N$ (half of outside diameter)

Radius where pinhole is disposed ($r_j = r_o + s \cdot j$)  (11)

Track No. where pinhole is disposed ($i = N - [(2j - N/2) - 1]$)  (12)

Figure 8:
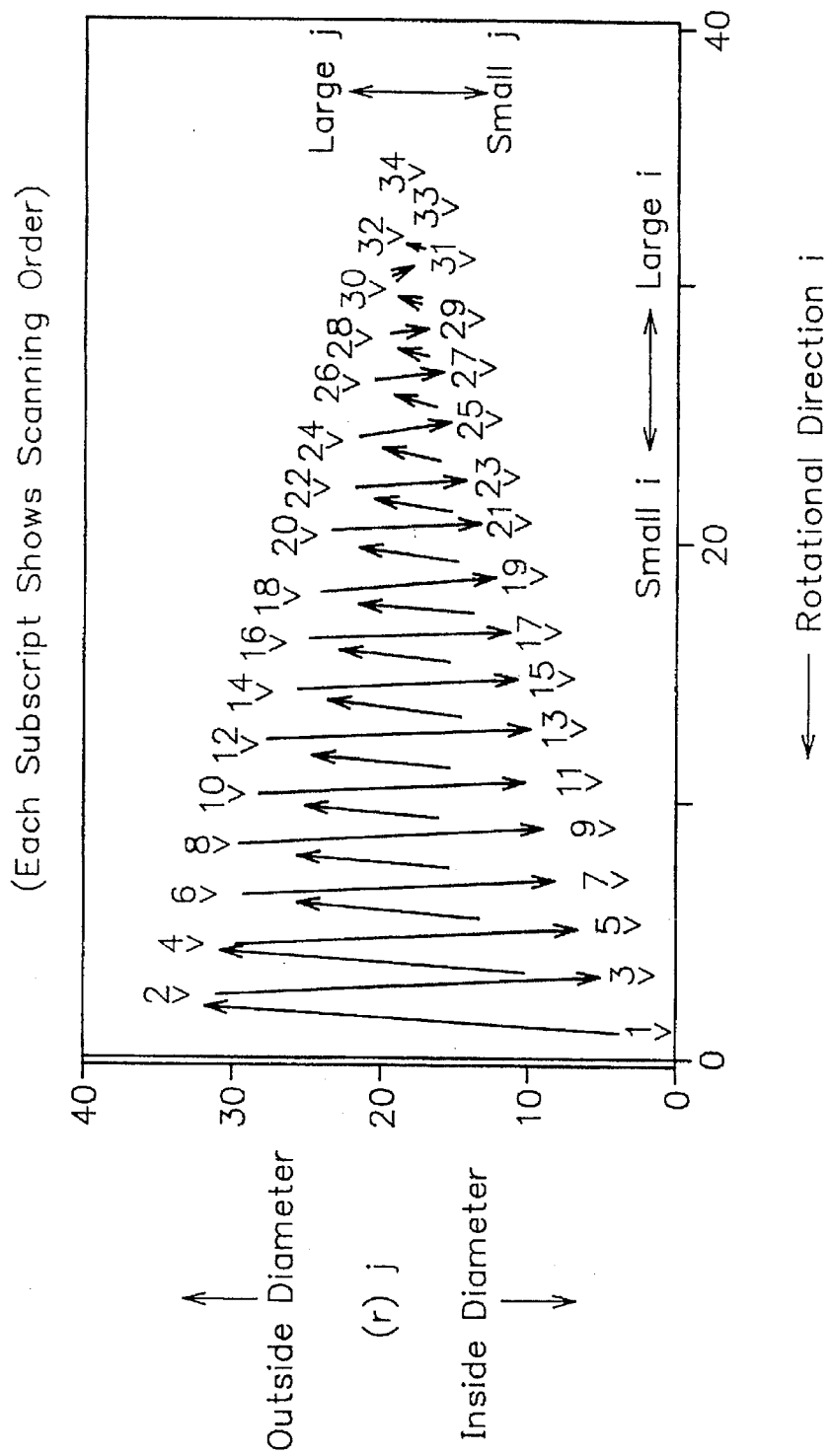
FIG. 8 is a diagram depicting the scanning order when the pinhole pattern of FIG. 6 is rotated.

When the pinhole disk on which the pinholes are disposed is rotated, scanning is carried out in the sequence shown in FIG. 8.

FIG. 8 illustrates the case when N=34. Consider the case when r', which is different from the true radius r, is scanned due to decentering e. Generally, a plurality of image planes are measured by one rotation of the pinhole disk, so that the drift value of the radius position due to decentering within one image plane regularly increases or decreases with the rotation angle. For example in FIG. 2, 16 threads equals 16 image planes per rotation. When the gap between neighboring pinholes is g, as measured in micrometer/pinhole, the drift of the radius position of the jth pinhole from the inside diameter is calculated as follows:

$$r_j' = r_j + i \cdot g \quad (13)$$

Figure 9:
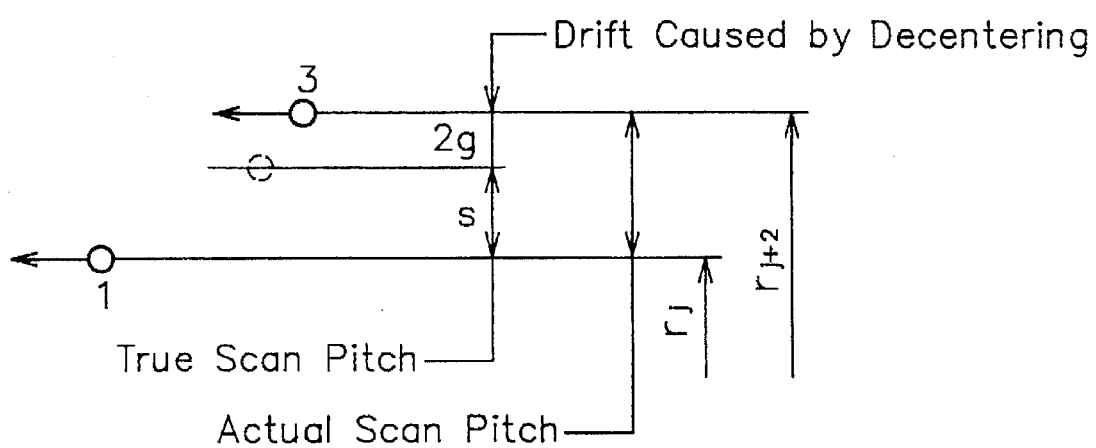
FIG. 9 is a diagram to explain the reduction of drift caused by decentering with the pinhole arrangement of FIG. 6.

In the arrangement of pinholes shown in FIG. 8, scanning order i of the pinhole heading from the inside periphery to the outside periphery, i.e. order j, drifts two by two. For example, i=1, 2, 3, . . . ; the bottom row is j=1, 3, 5. . .; and the upper row is j=32, 30, 28. . . Accordingly, the drift $\delta$ from the true radius r caused by decentering e are all below 2 g as shown in FIG. 9. When expressed as an equation, the inside diameter becomes constant regardless of the diameter, that is:

$$r_j + 1' - r_j' = (r_j + s + 3 \cdot g) - (r_j + 1 \cdot g) \quad (14)$$
$$= s + 2g$$
$$= s + \delta$$

Drift may be reduced by 2g by distributing the width of the stripes which is $g \cdot N$ as a whole. The gap g of $r_j + 1$ is larger than $r_j$ because j increases by 1 in equation (10) and becomes $$i_{j+1} - i_j = [2(j+1) - 1] - (2j - 1) = 2$$

Similarly, j increases by 1 in equation (12) at the outside periphery and it becomes $$i_j + 1 - i_j = N - [2((j+1) - N/2)] - [N - [2(j - N/2) - 1]]$$
$$= -2$$

As a result, drift becomes 2g at the inside periphery and a wider area than in the case when no decentering exists, is scanned, so that the image is darkened. Similarly, it becomes −2g at the outside periphery, and the image is brightened. The drift $\delta$, which is the width of the stripe, caused by decentering e is 4g in total.

If one image plane is constructed by scanning the pinholes of N=34 and drift per image plane due to decentering e'=34 micrometer, conventionally the width of the stripe is $\delta = e' = 34$ micrometer. According to the invention, however, $\delta = 4g = 4 \cdot e'/N = 4$ micrometer. That is, advantageously, with the invention, drift is about ⅛ that of the conventional devices. If N is increased, the effect is also enhanced and the effect becomes 4e/N.

The drift value, i.e. width of stripe, of the radius position caused by decentering may be reduced to 4 g in the same manner as the FIG. 6 embodiment by the following pinhole arrangements.

1. Those pinholes at the inside diameter are odd numbered and those pinholes at the outside diamter are even numbered, in the order of scanning, and the radius regularly decreases at the inside diameter and increases at the outside diameter.

2. The pinholes at the inside diameter are even numbered and the pinholes at the outside diamter are odd numbered in the order of scanning and the radius regularly increases at the inside diameter and decreases at the outside diameter.

3. The pinholes at the inside diameter are even numbered and the pinholes at the outside diameter are odd numbered in the order of scanning and the radius regularly decreases at the inside diameter and increases at the outside diameter.

Even in a twin peak type arrangement shown in FIG. 10(A) as contrasted to the single peak type arrangement of the previous embodiment, the drift value δ of the radius position caused by decentering may also be reduced to about δ=10g as shown in FIG. 10(B). For example, if N=34, the width of the stripe is reduced to about ⅓.

The width of the stripe caused by the decentering may be reduced by scanning one image plane by a plurality of pinhole rows and by disposing the pinholes so that the radius of the center position of all the pinholes of the plurality of pinhole rows on the one image plane differ from each other.

Figure 11:
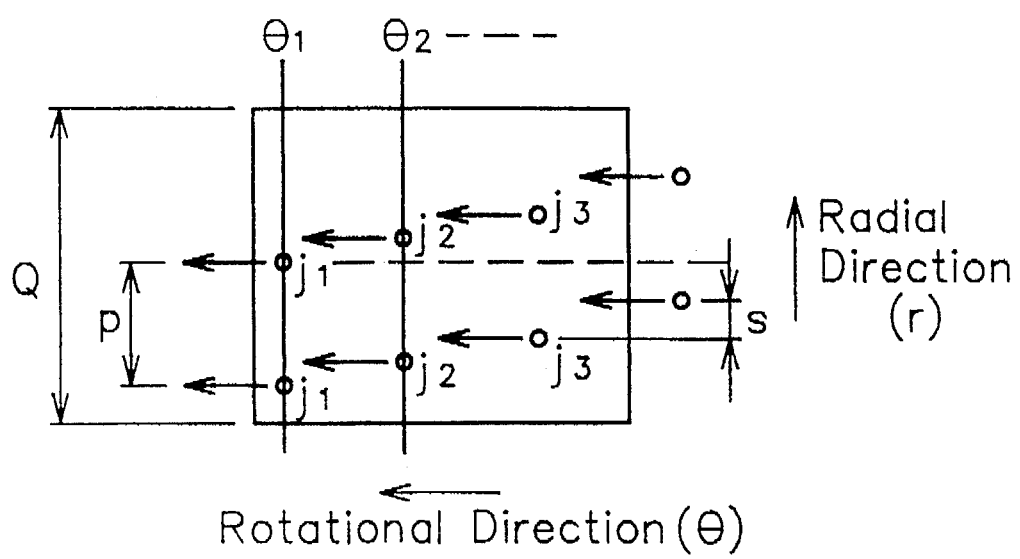
FIG. 11 is a modified illustrative embodiment of the embodiment of FIG. 6.

Next, when one image plane is to be scanned, the speed of measurement may be increased by using a plurality of pinholes at the same time, not just one pinhole, as shown in the previous embodiment. For example, consider the case when pinholes are disposed radially and two pinholes are separated by pitch p in the same angle $\theta_i$, wherein i=1,2,... $N_m$, as shown in FIG. 11. In this case, the radius of the pinhole in the next angle $\theta_i+1$ is located at a position drifted by scan pitch s. When this is considered as $j_1, j_2, \ldots, j_N$, the number of pinholes N necessary for constructing one image plane may be expressed as follows.

$$N_m = p/s$$

In a multiple pinhole structure, measurement of one image plane is completed always when scanning is carried out by $N_m$ in the angular direction regardless of the value of the size of the visual field Q. In the single pinhole structure, that is where there is only one pinhole at the same angle θ, it takes $N_m$ time to scan. Accordingly, it may be considered that one block is formed by p, in micrometers, in the radial direction and $N_m$ in the peripheral direction. In the case of the multiple pinhole structure, the block may be handled as one image plane and the speed of measurement is increased. The pinhole arrangement shown in the embodiment may form a multi-pinhole arrangement and enable the width of the stripe caused by decentering to be reduced and the speed of measurement to be increased.

As described above, according to the second embodiment of the invention, one image plane is scanned by a plurality of pinhole rows and the pinholes are disposed so that the radius of the center position of all the pinholes in the plurality of rows on the one image plane differ from each other, so that stripes are prevented from occurring even if the decentering is large.

When pinholes are disposed in an isometric path, as seen in the above embodiment, i.e. when the pinholes are disposed on imaginary tracks, nonuniformity of brightness occurs during optical scanning because the interval between the imaginary tracks is widened more at the outside periphery than at the inside periphery, even if the scan order is in a spiral shape and the amount of light is decreased at the outside periphery as compared to the inside periphery.

As a pinhole arrangement for eliminating such nonuniformity of brightness during optical scanning, the pinhole arrangement of the first embodiment of the invention may be used.

Consider that the imaginary track is a band having a constant width and is disposed in a coiled manner toward the inside. In such a case, the outside periphery of the imaginary track is reduced as compared to the one in which pinholes are disposed at an isometric angular pitch. Moreover, if a multi-pinhole row on the imaginary track is arranged with equal pitch p, the distance between the pinholes is constant regardless of the diameter. If the pitch p and the width of the imaginary track are the same, the density becomes equal to the case where the pinholes are disposed in a square.

The curvature of the spiral is generally large, so that it is almost linear and the influence of the curve may be ignored within the range of the pitch p. As a result, the pinholes may be disposed so that the nonuniformity in brightness at the inside and out side peripheries of the disk is eliminated. In such a case, the pinhole arrangement of the embodiment may be used to enable the width of the stripe caused by decentering to be reduced and the optical scanning to occur without the nonuniformity of brightness at the inside and outside peripheries.

Figure 12A:
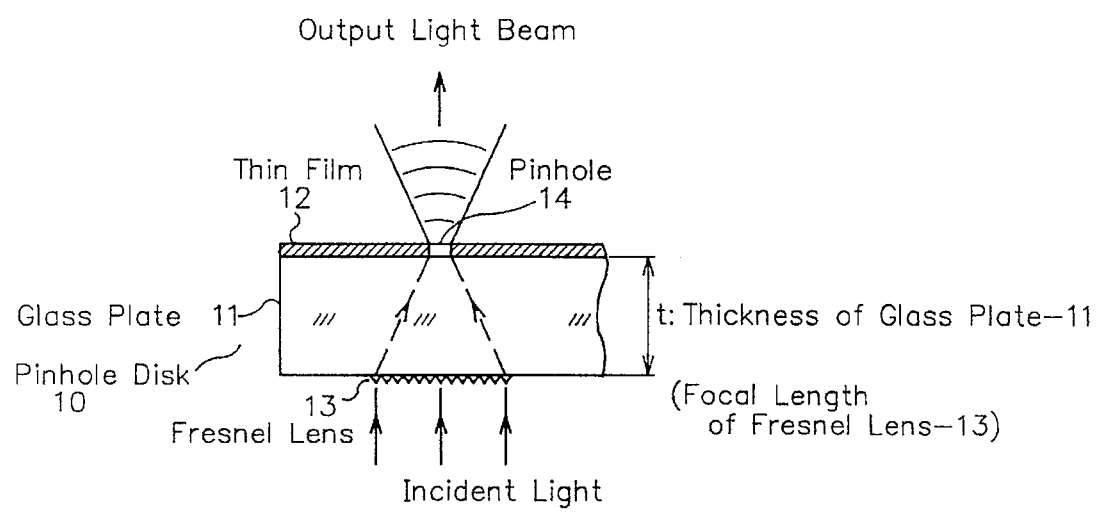
FIGS. 12(A) and 12(B) are diagrams depicting a third illustrative embodiment of the invention.
Figure 12B:
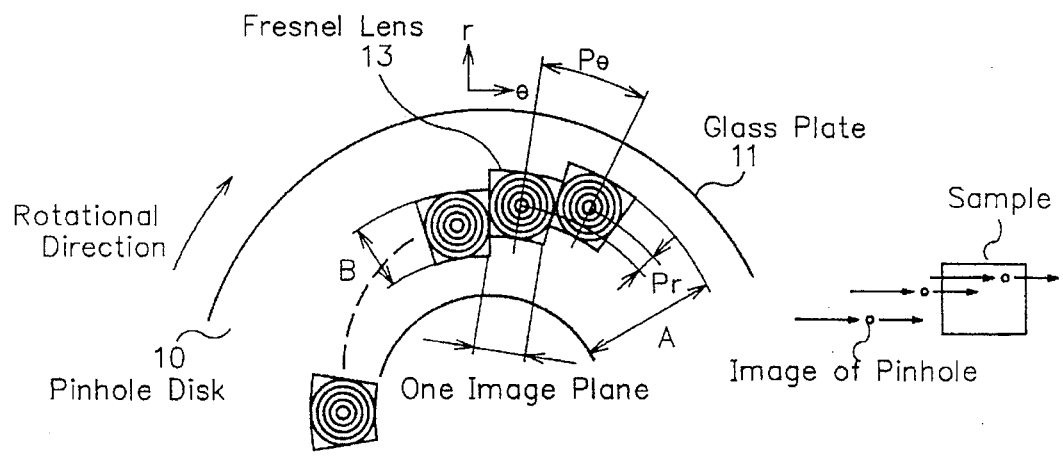

FIGS. 12(A) and 12(B) show a third embodiment wherein in FIG. 12(A), a thin film 12 is formed on one side of a glass plate 11 and a Fresnel lens 13 is formed on the other side of glass plate 11. The thickness t of glass plate 11 is the same as the focal length of Fresnel lens 13. A pinhole 14 is provided on film 12 at the focal position of Fresnel lens 13. The formation and positioning of the thin film 12, Fresnel lens 13, and pinhole 14 may be carried out by using a variety of known methods, such as the semiconductor mask pattern method, and the method involving evaporating, decoloring or etching of a thin film using laser beams. The pinhole 14 is formed at the collector position of the Fresnel lens 13. Moreover, as shown in FIG. 12(B), a plurality of Fresnel lenses 13, formed on one side of plate 11, are formed by drifting their focal positions one by one by spacing Pr in one image plane in the radial direction so that an image of the pinholes may scan the sample when pinhole disk 10 is rotated by a motor at a constant speed.

Figure 13:
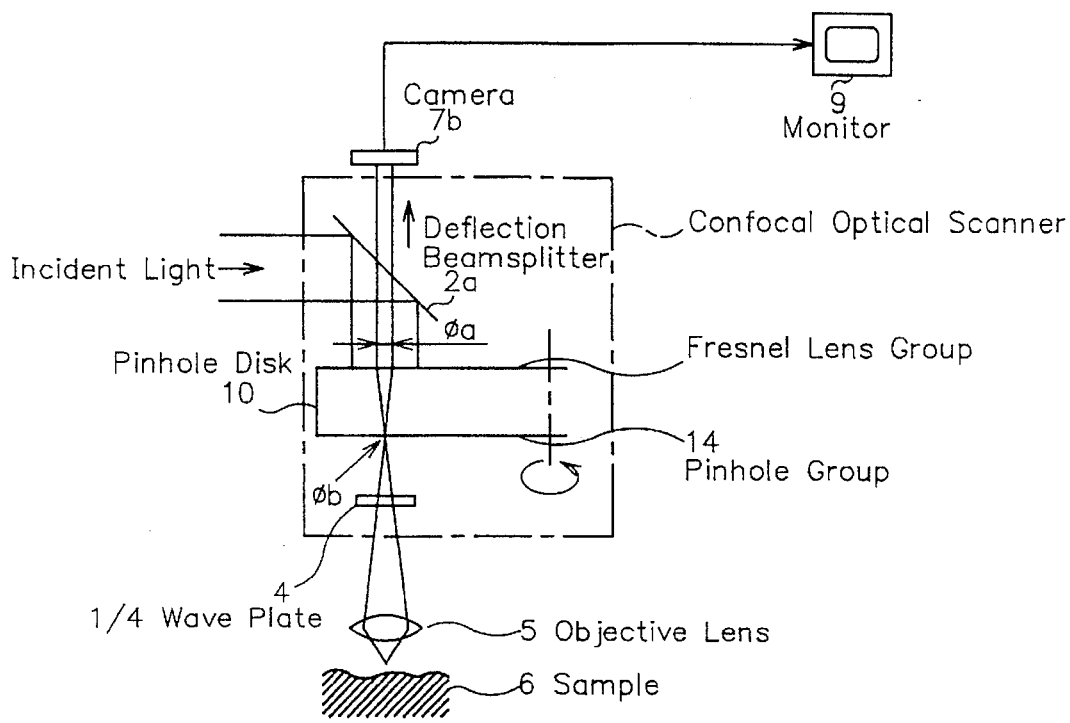
FIG. 13 is a diagram depicting the pinhole disk of FIGS. 12(A) and 12(B) as used in a confocal microscope.

In FIG. 13, an output light, which may be a white light or a laser beam, from source,not shown, is applied to a pinhole disk 10, as parallel light by a beam splitter 2. The light inputted to disk 10 is collected at an inlet of pinhole 14 formed at the collector position of Fresnel lens 13 (such as by Fresnel lens 13 shown in FIG. 12(A)) and more light is collected through Fresnel lens 13. Returning to FIG. 13, the light passes through pinhole 14 to irradiate sample 6 through an objective lens 5, after passing through ¼ wave plate 4. The light reflected from sample 6 again passes through disk 10 and is inputted to a light receiver or camera 7b through the deflection beam splitter 2a and an image of the sample 6 is then displayed on a monitor 9. In this embodiment, disk 10 is rotated at a constant speed by a motor, not shown, and an image of the pinhole 14 scans the sample 6 due to the rotation of disk 10. Since pinhole 14 and the light spot on sample 6, that is the image of the pinhole, have a confocal relationship and both the incident light from the light source and the light reflected from the sample 6 pass through pinhole 14, high resolution is obtained due to the confocal effect.

The light receiver 7b may be an eye piece instead of a camera, and manual observation using the human eye is thus also possible. Also, the light receiver may comprise a photodiode or high sensitive photomultiplier and use one beam per image plane. Moreover, the deflection beam splitter 2a may be a half-mirror, in which case the ¼ wave plate 4 becomes unnecessary. By using a dichroic mirror for the deflection beam splitter, fluorescence of the sample may also be measured. Also, in that case, the ¼ wave plate is unnecessary. Furthermore, multiple beams may be used, and the amount of light in one image plane and speed of rotation may be increased.

Figure 14:
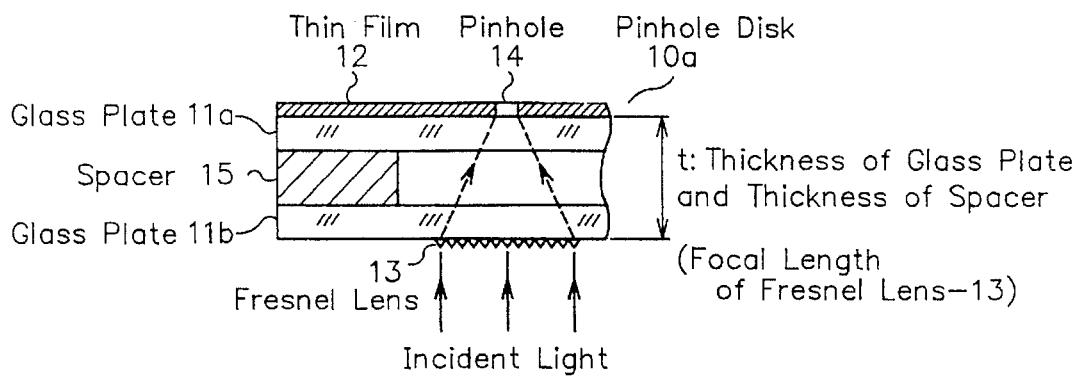
FIG. 14 is a modified illustrative embodiment of the pinhole disk of FIGS. 12(A) and 12(B).

FIG. 14 is a modification of the embodiment of FIG. 12, wherein pinhole 14 and Fresnel lens 13 formed on thin film 12 are formed separately on glass plates 11a and 11b and a spacer 15 is disposed therebetween so that pinhole 14 is positioned at the focal position of Fresnel lens 13. Incident light is collected at the inlet of pinhole 14 by Fresnel lens 13 similarly to the case of FIG. 2 and more light is collected by the Fresnel lens 13 so that luminous utilization efficacy is improved and fabrication of the arrangement becomes easier than the device of FIG. 12 since thin film 12 and Fresnel lens 13 may be formed on separate glass plates.

Figure 15A:
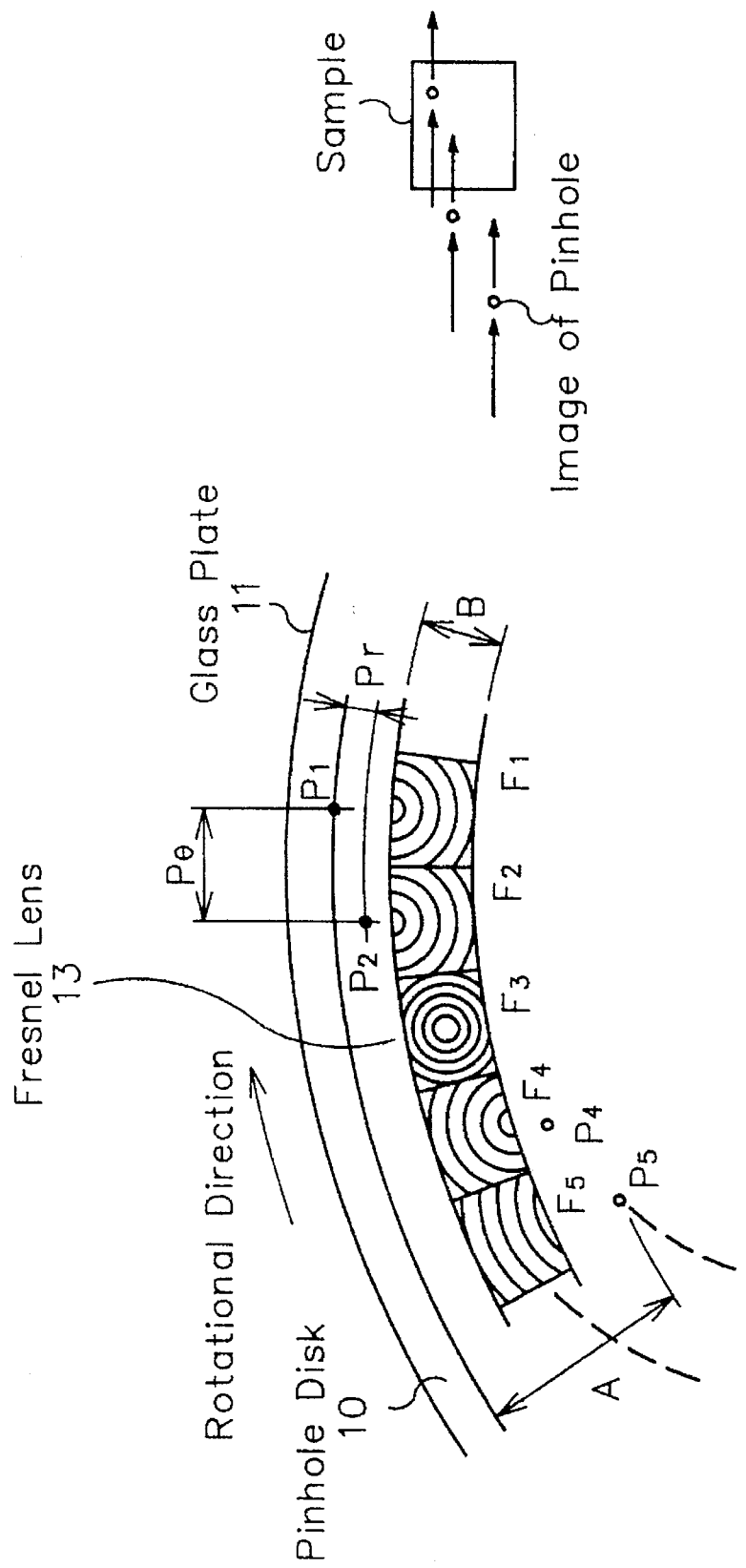
FIGS. 15(A) and 15(B) are diagrams depicting the pinhole disk of a fourth illustrative embodiment of the invention.
Figure 15B:
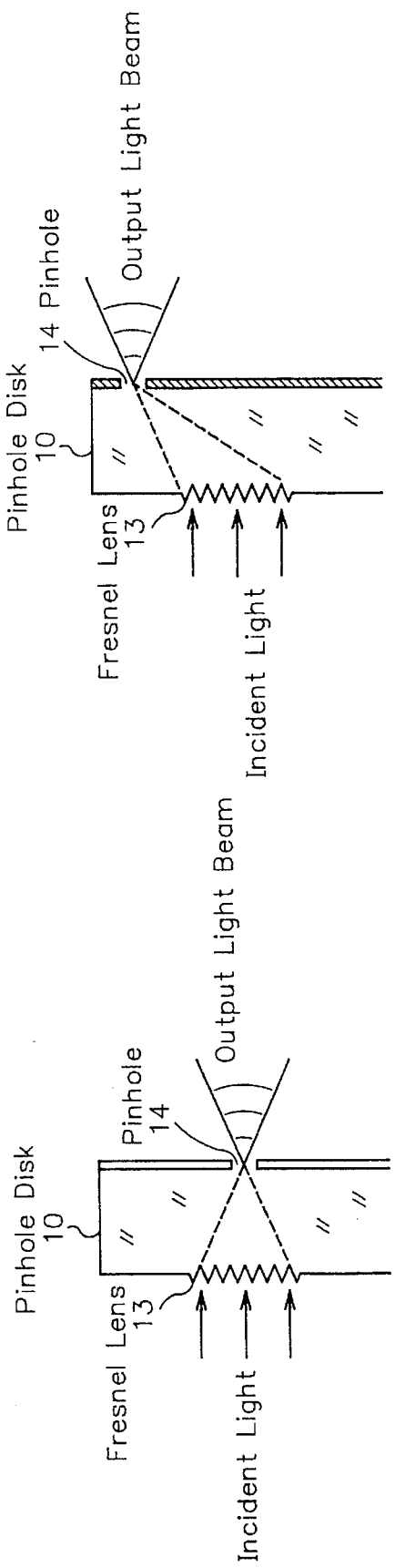

FIGS. 15(A) and 15(B) show a fourth illustrative embodiment, wherein in FIG. 15(A), the Fresnel lenses 13 (F1,F2,F3...)form a Fresnel lens group arranged in a row in the circumferential direction with a constant width, i.e. the width of the aperture pupils of the Fresnel lenses, in the radial direction. As shown in FIG. 15(B), the Fresnel lens group contains lenses whose focal point is outside the aperture pupil width B (in FIG. 15(B), F1 and in FIG. 15(A))F1, F2, F4, F5 and lenses whose focal point is inside of the aperture pupil width B (F3 in FIGS. 15(A) and 15(B)). The Fresnel lens whose focal point is outside of aperture pupil B (of Fresnel lens F1 for example) is formed by presuming a large Fresnel lens whose focal point P1 is made into a rotational symmetry and by using a pattern where the peripheral portion thereof is cut. Moreover, the illumination range in the radial direction of illumination light irradiated on the disk 10 is limited only to the width in the radial direction of the Fresnel lens 13.

The Fresnel lenses are formed by drifting an image plane a distance Pr in the radial direction so that image of the pinhole will scan the sample when light is irradiated on the pinhole disk rotating at a constant speed, in FIG. 12. Accordingly, although it is necessary to illuminate the entire A dimension in the radial direction, light is illuminated on the sample only by an amount equal to the width of the aperture pupil B so that the luminous utilization efficacy becomes B/A and is improved as compared to the prior art. However, this improvement in some cases may not be sufficient.

The luminous utilization efficacy is further improved by overcoming the problem illustrated in FIGS. 15(A) and 15(B). In FIGS. 15(A) and 15(B), along the rotation of disk 10, the focal point Pi (wherein i=1, 2,...) scans the sample. In this case, although the illumination range in the radial direction of the illumuniation light irradiated on the disk 10 is limited to only width B in the radial direction of the Fresnel lens 13, the image of the pinhole can scan the range of dimension A in the radial direction on the sample. Accordingly, the light illumination area may be reduced and the luminous utilization efficacy becomes B/B and is further improved as compared to FIG. 12.

The Fresnel lens may comprise a plurality of patterns, with variable density and phase difference, and disposed concentrically and alternately, although such an arrangement may cause decrease in the amount of light. Also, the lens may comprise a sawtooth section. Furthermore, the glass plate may be made of plastic and injection molding may be used to form such plate.

Figure 16:
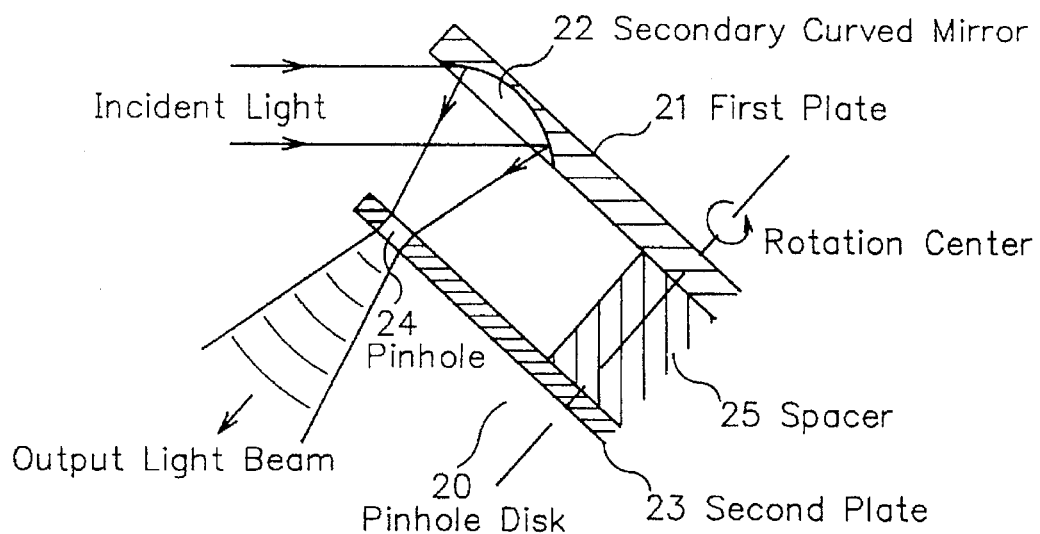
FIG. 16 is a diagram depicting a modified illustrative embodiment of the pinhole disk of FIGS. 12(A) and 12(B).

FIG. 16 is a further modification of the pinhole disk of FIG. 12, wherein a plurality of secondary curved mirrors 22 are disposed in a spiral shape at the outside peripheral portion of one side of a first plate 21. The same number of pinholes 24 as the plurality of secondary curved mirrors 22 are disposed in spiral shape on the outside peripheral portion of a second plate 23. The first plate 21 and the second plate 23 are constructed with a spacer 25 therebetween and having the same rotational center so that pinholes 24 are disposed at the focal position of the secondary curved mirrors 22. A pinhole disk 20 is rotated at a constant speed by a motor and shaft, not shown, and images of the pinholes scan the sample.

When light from a source, not shown, is inputted to secondary curved mirror 22, its reflected light is collected at the inlet of pinhole 22 disposed at the focal position of secondary curved mirror 22. With this embodiment, more light is collected and the luminous utilization efficacy is improved. Furthermore, since no lens is used as a light collecting means, as compared to the embodiment of FIGS. 12 and 15(A),15(B), this embodiment is not adversely influenced by chromatic aberration of the lens. Accordingly, since there is no limitation in the wavelength which can be used, simultaneous illumination using a plurality of wavelengths, such as by using a RGB laser, and the like, becomes possible. Color images may also be obtained and ultraviolet rays may be used. The collection of light at the outside of the light axis shown in FIGS. 15(A) 15(B), is also possible using the secondary curved mirrors of FIG. 16.

In the third embodiment and fourth embodiment, light collecting efficiency is increased and luminous utilization efficacy is improved by placing the pinholes on the disk and light collecting means in the manner of the first and second embodiments. Furthermore, optical scanning without non-uniformity of brightness at the inside and outside peripheries of the disk is realized and the width of the stripes caused by decentering is reduced.

Furthermore, the light collecting means may comprise a micro convex type micro lens or a refractive index distributed plate micro lens which is formed by doping a material having a high refractive index into a plate having a low refractive index, instead of the Fresnel lens or the secondary curved mirror , and the same effect can be obtained.

Figure 17:
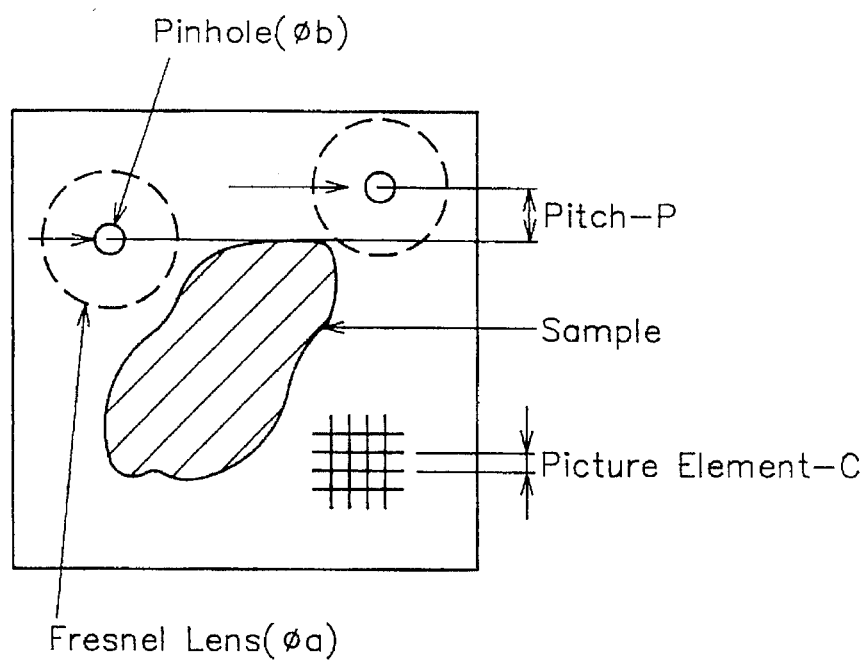
FIG. 17 is a drawing to explain the operation of the embodiment of FIG. 13.

In FIG. 13, since the light, which is reflected by the sample 6 and which is transmitted through disk 10 again returns to parallel light, the light diaphragmed to φb becomes a parallel light with φa and becomes large after passing through Fresnel lens 13 on disk 10. For example, as shown in FIG. 17, if the size of a picture element c is b<c<a, scan pitch p of the image of pinhole 14 is generally p<a, and the resolution of the image of the sample viewed by the camera 7b is apparently reduced. If a lens is inserted between the deflection beam splitter 2a and camera 7b to increase the resolution, the light reflected from the sample and passed through disk 10 is collected at one point by the lens and no image is formed since the light beams are all parallel. Furthermore, if Fresnel lens 13 accompanies the reduction of the amount of light , such as a Fresnel zone plate, luminous utilization efficacy is worsened and very weak fluourescent light from the sample is decreased, thereby resulting in the decrease of sensitivity. Moreover, since the light collecting means, such as Fresnel lens 13, generally has a circular shape, there is the possibility that light between neighboring Fresnel lenses arrives at the pinhole surface as it is and becomes surface reflection ,or stray light, from the disk surface, thereby causing the lowering of resolution. The fifth and sixth illustrative embodiments of the invention solve this foregoing problem.

Figure 18:
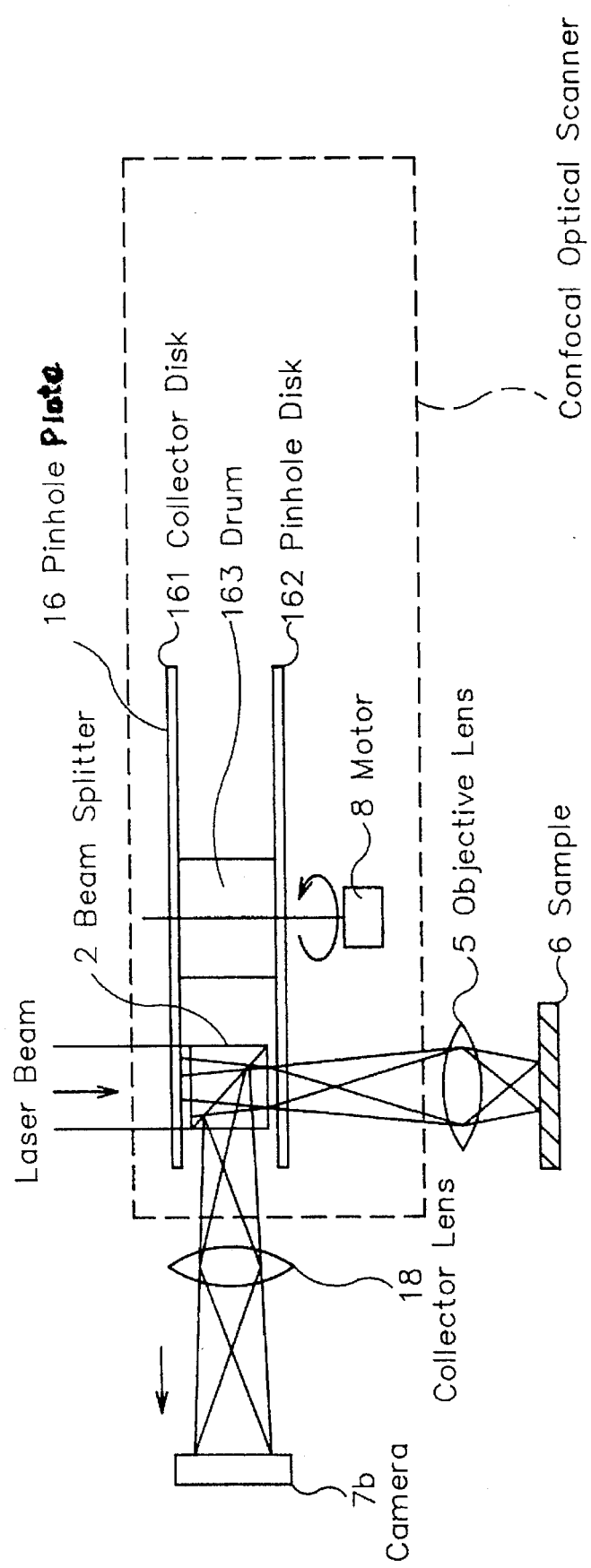
FIG. 18 is a diagram depicting the structure of a fifth illustrative embodiment of the invention.
Figure 19A:
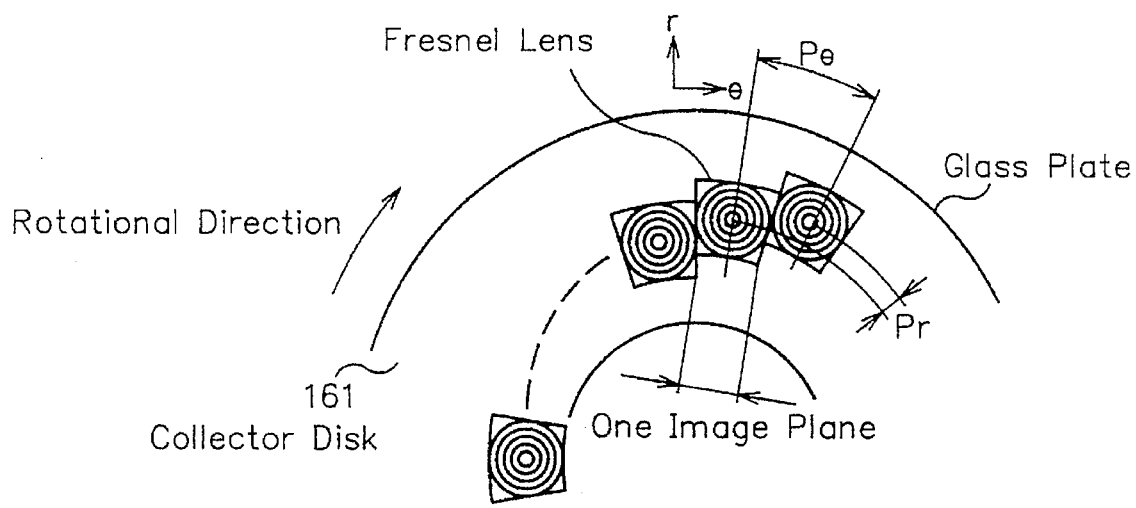
FIGS. 19(A) and 19(B) are diagrams depicting the structure of a collector disk and a pinhole disk used in the embodiment of FIG. 18.
Figure 19B:
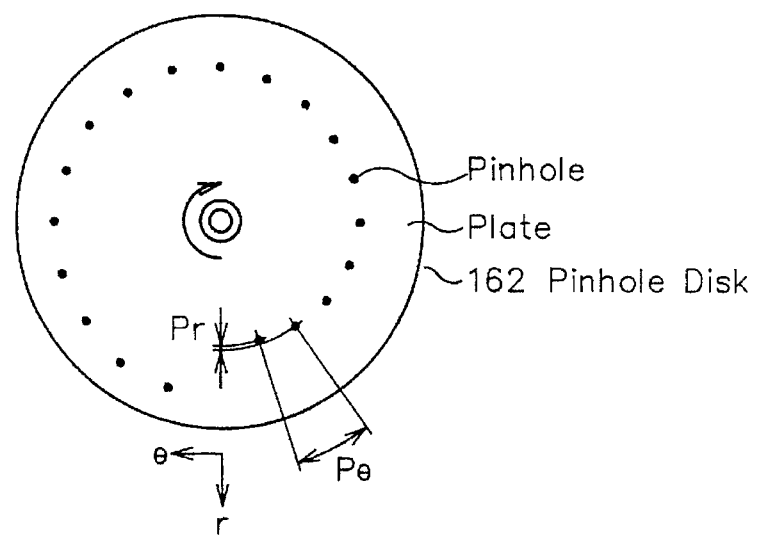

FIG. 18 shows a fifth illustrative embodiment, wherein the confocal optical scanner comprises a collector disk 161, on which a plurality of Fresnel lenses, formed on one side of a glass plate, as shown in FIG. 19(A), are formed by drifting the image plane of its focal position by an amount Pr in the radial direction; a pinhole disk 162 on which a plurality of pinholes formed on a plate, as shown in FIG. 19(B) are formed by drifting an image plane by an amount Pr (Pθ being in the circumferential direction) in the radial direction; a pinhole plate 16 comprising a drum for connecting collector disk 161 and pinhole disk 162 so that the pinholes are disposed respectively at the focal position of the Fresnel lenses; a beam splitter 2 provided between collector disk 161 and pinhole disk 162; and a motor 8 for rotating pinhole plate 16 at a constant speed. Both collector disk 161 and pinhole disk 162 may be easily fabricated using a semi-conductor mask process, or the like. Beam splitter 2 is held in a space by a support device,not shown, provided at right angles from a sheet surface and its transmission/ reflection ratio is 50:50. An objective lens 5 irradiates output light from the pinholes onto sample 6 and is provided at a position where the reflected light from sample 6 enters the same pinholes again. A collector lens 18 is provided at the position and focal distance where the image of the pinhole is formed on the camera 7b at the left side of the confocal optical scanner.

The output light may be a white light or a laser beam from a source not shown, and is inputted to the confocal optical scanner and is collected by the Fresnel lens formed on collector disk 161 of plate 16 and is collected at the pinholes formed on disk 162 after being transmitted through beam splitter 2. The light transmitted through the pinhole is irradiated onto sample 6 by objective lens 5. The light reflected from sample 6 again passes through objective lens 5 and disk 162 and is reflected by beam splitter 2, ie. bent at right angles from the light axis direction of the incident light. Then, an image of sample 6 is formed on camera 7b after passage through collector lens 18.

In this embodiment, pinhole plate 16 is rotated by motor 8 at a constant speed, and the image of the pinhole scans the sample 6 due to the rotation of the plate 16. Furthermore, since the pinhole on disk 162 and the light spot on sample 6 have a confocal relationship and both the incident light from the light source and the reflected light from sample 6 pass through the pinhole, high resolution is obtained. Moreover, since the reflected light from sample 6 does not pass through collector disk 161, the confocal resolution obtained from the diameter of the pinhole is maintained and , even if the Fresnel lens causes the amount of light to decrease, all of the reflected light is received.

Figure 20A:
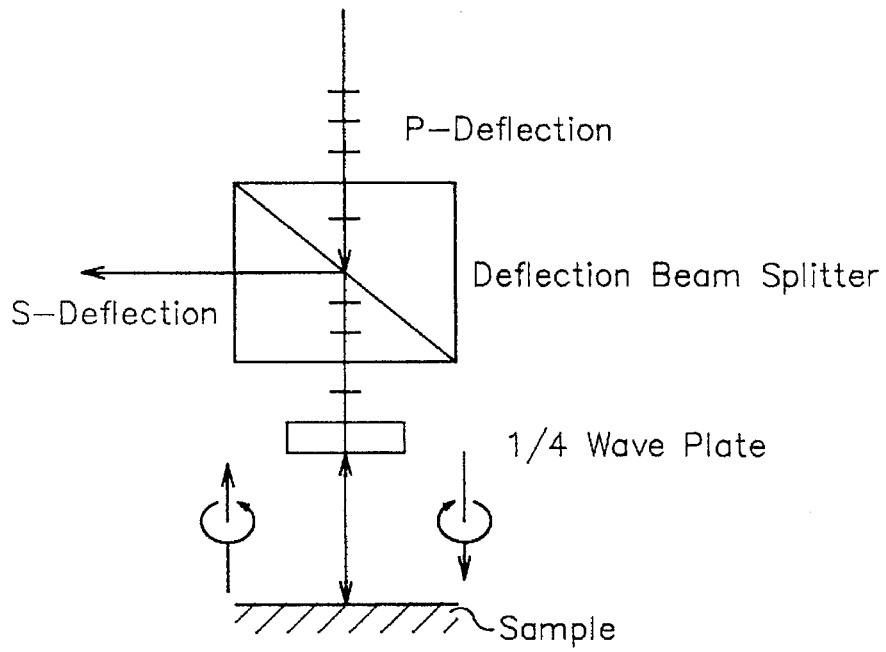
FIGS. 20(A) and 20(B) are diagrams depicting the structure of another illustrative embodiment comprising a branch optical system used in the embodiment of FIG. 18.
Figure 20B:
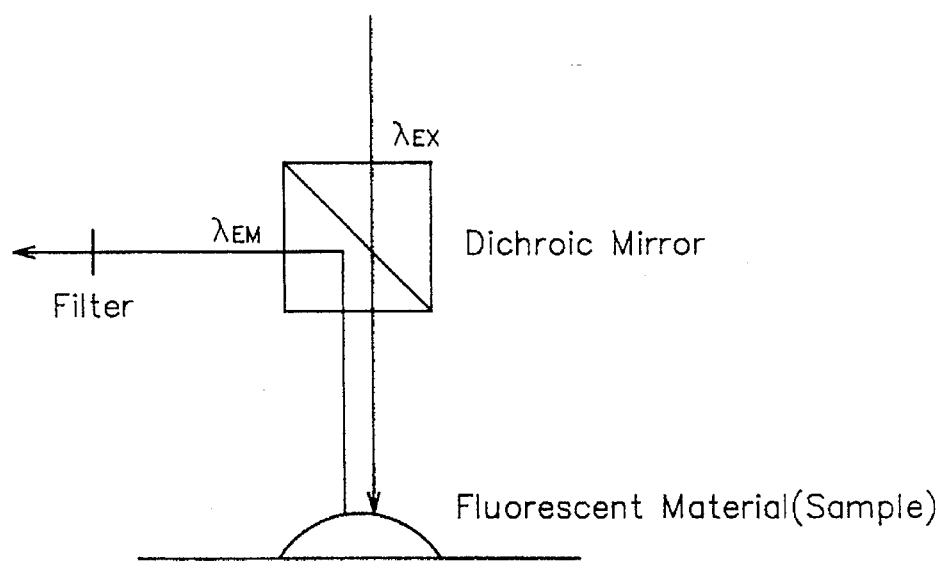

Advantageously, alternative components may be used. For example, an eyepiece may be used instead of camera 7b. Also, as shown in FIG. 20(A), a deflection beam splitter may be used in place of the beam splitter 2, and a ¼ wave plate disposed between the pinhole disk 162 and sample 6. If the incident light is made to have a p-deflection, the incident light passes through the deflection beam splitter. This light becomes a circular deflection after passing through the ¼ wave plate, and when it is reflected by sample 6 and again passes through the ¼ wave plate, it become an s-deflection and is reflected by the deflection beam splitter. The ratio of s:p may be in the range of 2:98 to 1:10,000, so that the efficiency of the incident light and reflected light is improved. Furthermore, beam splitter 2 may be a dichroic mirror as shown in FIG. 20(B). In this case, if a characteristic for transmitting incident light (i.e. exciting light $\lambda_{EX}$) and reflecting the return light (i.e fluorescent light $\lambda_{EM}$) from sample 6 (ie a fluroscent substance) is given, an exciting light $\lambda_{EM}$=3%, and a fluroscent light $\lambda_{EM}$=80% may be easily obtained with reflectance of the return light. A filter for cutting the exciting light $\lambda_{EM}$ is disposed at the right side to provide a higher S/N ratio.

FIG. 21 shows a modification of the embodiment of FIG. 18, wherein the difference therebetween is in the pinhole plate 16 being constructed of collector disk 161 disposed at the side and pinhole disk 162 being disposed at the bottom; and the light path of the illumination light inputted to the collector disk 161 from the side of pinhole plate 16 being bent at right angles by beam splitter 2 and being irradiated onto the sample 6 through pinhole disk 162; and the light reflected from sample 6 being passed through beam splitter 2 after being passed through pinhole disk 162; and images being formed on camera 7b after light is passed through collector lens 18.

Accordingly, also in this embodiment, both the incident light from the source and the reflected light from sample 6 pass through the pin hole and due to the confocal effect, there is obtained high resolution. Moreover, the light reflected from sample 6 does not pass through collector disk 161, so that the confocal resolution obtained from the diameter of the pinhole, is maintained.

Figure 22:
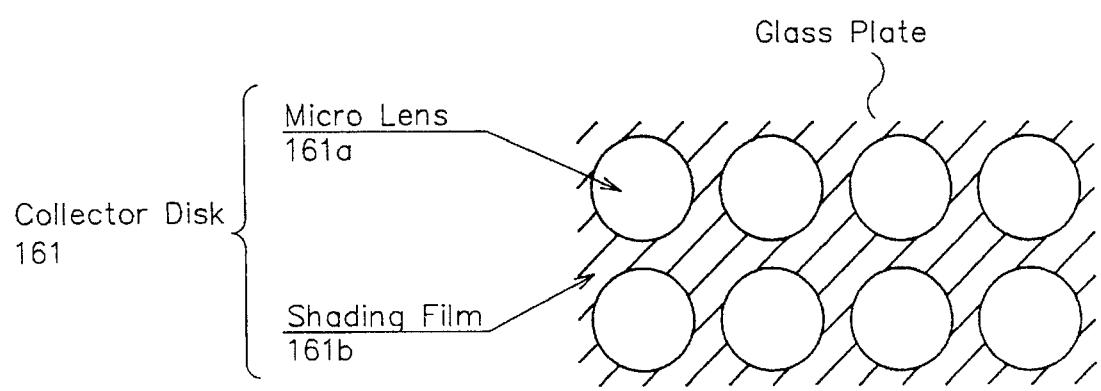
FIG. 22 is an enlarged drawing depicting the collector disk of a sixth illustrative embodiment of the invention.

FIG. 22 shows an enlargement of the collector disk of a sixth illustrative embodiment of the invention, wherein a plurality of micro lenses 161a, which are used as collector means, are formed on a glass plate. Shading film 161b, for example, a chromium film which has about 15% reflectance and low transmittance, is formed at portions where no micro lenses 161a are formed on the glass plate. In this case, since the area other than the micro lenses 161a of the collector disk 161 is shaded by the chromium film, light irradiated onto the other areas is reflected by the shading film 161b and does not reach the pinhole disk, not shown, and stray light, which is surface reflection, is reduced. Moreover, since the areas where the mico lenses 161a are formed is the glass plate which has about 4% reflectivity, stray light from that area of the pinhole disk is also reduced.

In the fifth and sixth illustrative embodiments, the collector disk may comprise a Fresnel zone plate comprising a plurality of patterns of variable density and phase difference disposed alternately and concentrically although with such an arrangement reduction of the amount of light may result. The collector disk may also comprise a convex micro lens which is formed by using a partially contracted chrystallized glass, or a refractive index distributed plate micro lens which is formed by doping a material having a high refractive index into a plate having a low refractive index. Also, the shading film may comprise an emulsion film instead of the chromium film.

Furthermore, in the fifth and sixth illustrative embodiments, the light reflected from the sample is not inputted to the collector disk by arranging the pinholes on the disk and by arranging the collector means in the manner shown in the first or second illustrative embodiments. In this manner, decrease of the resolution of the confocal point obtained by the pinhole diameter is prevented and imaging characteristics are improved since the amount of light reflected from the sample is not decreased even if a collector disk, which decreases the amount of light due to transmission therethrough, is used. Moreover, since the shading film is formed at the areas where there are no micro lenses on the collector disk, surface reflection, and hence stray light, is reduced. Also, optical scanning without nonuniformity of brightness at the inside and outside peripheries is attained. Also, the width of stripes caused by decentering is reduced.

According to the invention, the following and other advantages and features are attained.

1. Optical scanning with uniform brightness at the inside and outside peripheries of the pinhole disk is realized by arranging the pinholes with the same or equal pitch along the track of the spiral.

2. A confocal optical scanner is provided in which substantially no stripes are caused even if decentering is large. Thus, with the invention decentering is an acceptable state, and furthermore, separation, and interchange, of the pinhole disk and motor are possible.

3. More incident light is collected at the pinholes by using a pinhole disk in which pinholes are disposed at the focal points of a plurality of collector means.

4. The invention provides collector means which focus outside of the aperture pupil width so as to reduce area of light illumination. Hence, luminous utilization efficacy is greatly improved.

5. Since light illuminated at the surface of the pinhole disk, other than where the pinholes are located, is collected at the pinholes, reflected light from the disk surface is reduced and stray light caused by such surface reflection is substantially eliminated. Thus, with the invention a mechanism is provided for substantially eliminating stray light.

6. Since the invention provides for light reflected from the sample to not enter the collector disk, decrease of confocal resolution due to the pinhole diameter is prevented, and the amount of light reflected from the sample is not reduced. Hence, imaging characteristics are improved.

7. Since a shading film is formed at areas of the collector disk where no micro lens is formed, surface reflection, and hence stray light, from the disk surface is reduced.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. In a confocal optical scanner comprising a pinhole plate defining a plurality of pinholes to scan light passing through said pinholes onto a sample, the improvement comprising said pinhole plate comprising a collector disk on which a plurality of collector means are formed, a pinhole disk defining a plurality of pinholes, and means for connecting said collector disk and pinhole disk so that said pinholes are disposed at focal points of said plurality of collector means;

wherein said plurality of pinholes are formed in a plurality of lines outwardly extending from the center of said disk and in a plurality of substantially concentric rows extending outwardly from said center, wherein said rows are substantially spiral in shape, and wherein a first pitch between adjacent lines is substantially equal to a second pitch between adjacent rows as measured from the same pinhole;

wherein said first and second pitches are disposed to be equal when the center coordinate of each pinhole satisfies the following equation:

$$r_i = r_o + \theta_i \cdot m \cdot a/2\pi$$

$$\theta_i = [2\pi/(m \cdot a)][-r_o + \sqrt{r_o^2 + i \cdot m \cdot a^2/\pi}\,],$$

wherein i=1,2,..., n, being the order from inside of the spiral, $r_i$=radius of ith pinhole; and $r_o$=innermost radius; $\theta_i$=angle of ith pinhole; m=number of spirals; and a=pinhole pitch;

rotating means for rotating said pinhole plate at a constant speed; and a branch optical system provided between said collector disk and said pinhole disk of said pinhole plate; wherein light reflected from said sample is outputted after passing through said pinhole disk at a right angle direction from a light axis direction of said light inputted through said collector disk by being bent in its optical path by said branch optical system.

2. The scanner of claim 1, wherein each of said plurality of individual collector means comprises a micro lens.

3. The scanner of claim 2, wherein said micro lens comprises a micro convex type lens.

4. The scanner of claim 2, wherein said micro lens comprises a refractive index distributed plane.

5. The scanner of claim 1, wherein said pinhole plate comprises said pinhole disk disposed at a bottom thereof; and wherein light inputted to said pinhole plate is directed by said branch optical system and irradiated onto said sample through said pinhole disk; and wherein light reflected from said sample is transmitted to said branch optical system after passing through said pinhole disk.

6. The scanner of claim 1, wherein each of said plurality of collector means comprises a Fresnel lens.

7. The scanner of claim 1, wherein each of said plurality of collector means comprises a secondary curved mirror.

* * * * *